United States Patent
Sarkar et al.

(10) Patent No.: US 12,309,648 B2
(45) Date of Patent: *May 20, 2025

(54) HANDOVER MANAGEMENT IN A COMMUNICATIONS NETWORK CONFIGURED TO SUPPORT MULTI-RAT DUAL CONNECTIVITY

(71) Applicant: TELEFONAKTIEBOLAGET LM ERICSSON (PUBL), Stockholm (SE)

(72) Inventors: Debasish Sarkar, Irvine, CA (US); Surajit Mondal, Bangalore (IN); Shikha Singh, Haryana (IN); Ayan Sen, Karnataka (IN); Aruna Mani, New Delhi (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,428

(22) Filed: May 10, 2024

(65) Prior Publication Data

US 2024/0298221 A1 Sep. 5, 2024

Related U.S. Application Data

(63) Continuation of application No. 18/252,875, filed as application No. PCT/IB2020/062601 on Dec. 31, 2020, now Pat. No. 11,991,569.

(51) Int. Cl.
H04W 36/00 (2009.01)
H04W 36/30 (2009.01)
H04W 76/15 (2018.01)

(52) U.S. Cl.
CPC . *H04W 36/0069* (2018.08); *H04W 36/00698* (2023.05); *H04W 36/0085* (2018.08); *H04W 36/30* (2013.01); *H04W 76/15* (2018.02)

(58) Field of Classification Search
None
See application file for complete search history.

(56) References Cited

U.S. PATENT DOCUMENTS

| | | |
|---|---|---|
| 11,395,355 B2 | 7/2022 | Sharma et al. |
| 2017/0325138 A1 | 11/2017 | Da Silva et al. |

(Continued)

FOREIGN PATENT DOCUMENTS

| | | |
|---|---|---|
| JP | 2014033387 A | 2/2014 |
| JP | 2022552782 A | 12/2022 |

OTHER PUBLICATIONS

3GPP TS 37.340 v15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.

(Continued)

*Primary Examiner* — Charles N Appiah
*Assistant Examiner* — Frank E Donado

(57) ABSTRACT

A system, method and non-transitory computer readable media for facilitating adaptive anchor layer mobility in a 5G NSA implementation. In one arrangement, a handover modulation criterion involving relevant trigger parametrics of an anchor cell node serving a UE and a target cell node may be compared against a tunable threshold parameter indicative of the effect of the target cell on the anchor cell quality. If the handover modulation criterion does not exceed the tunable threshold value, a quality degradation prediction with respect to the UE may be executed to estimate a likelihood of service failure for the UE. Responsive to determining that the likelihood of service failure does not exceed a probability threshold, handover of the UE to the target cell may be suppressed.

21 Claims, 14 Drawing Sheets

(56) References Cited

U.S. PATENT DOCUMENTS

2019/0045507 A1    2/2019   Sorrentino et al.
2020/0022055 A1*   1/2020   Yan .................. H04W 36/0077
2021/0385705 A1*  12/2021   Liu .................. H04W 36/0072

OTHER PUBLICATIONS

Ali, Z., et al., "Machine learning based handover management for improved QoE in LTE", NOMS 2016—2016 IEEE/ IFIP Network Operations and Management Symposium, Istanbul, Turkey, 2016, pp. 794-798.
Sinclair et al., "A Kernel Methods Approach to Reducing Handover Occurrences within LTE", European Wireless 2012; 18th European Wireless Conference 2012, Poznan, Poland, Apr. 18-20, 2012.
Sinclair et al., "An Advanced SOM Algorithm Applied to an Advanced SOM Algorithm Applied to Handover Management Within LTE", IEEE Transactions on Vehicular Technology (vol. 62, Issue: 5, Jun. 2013), Mar. 8, 2013, pp. 1883-1894.
Zaidi et al., "AI-Assisted RLF Avoidance for Smart EN-DC Activation", In Globecom 2020-2020 IEEE Global Communications Conference, 2020, pp. 1-6, IEEE.

* cited by examiner

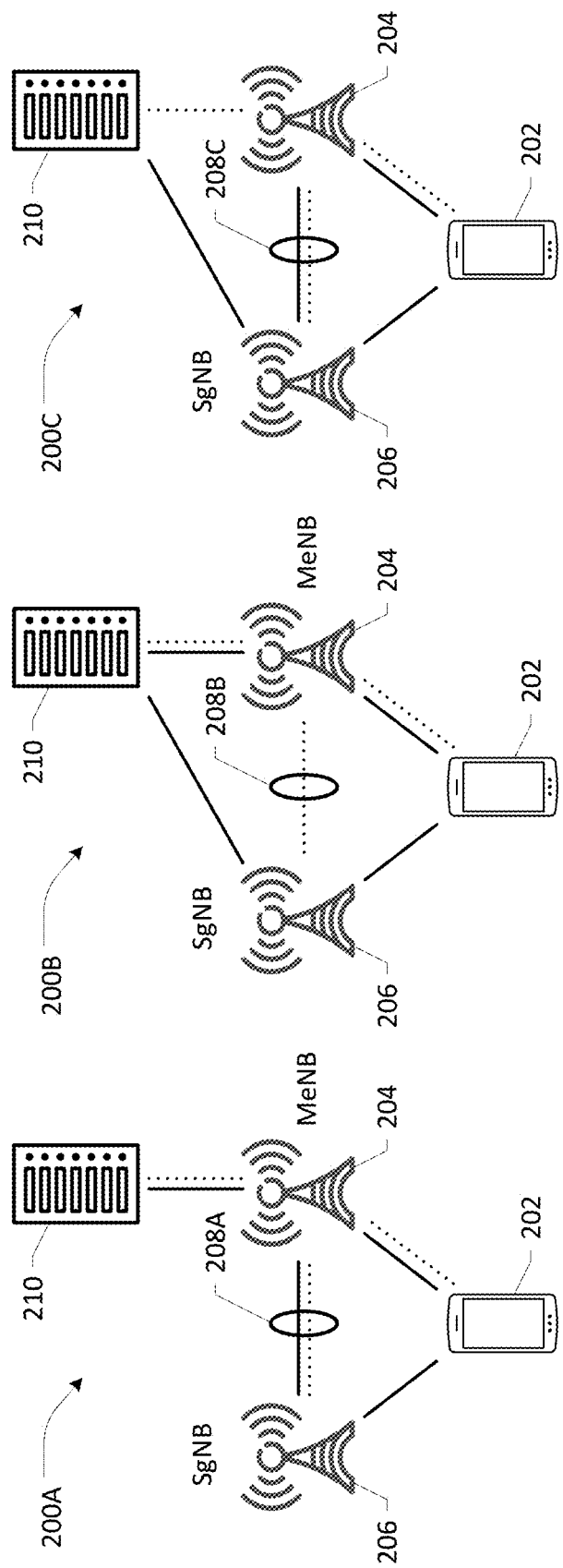

HANDOVER MANAGEMENT IN A COMMUNICATIONS NETWORK CONFIGURED TO SUPPORT MULTI-RAT DUAL CONNECTIVITY

PRIORITY CLAIM

This application is continuation of U.S. application Ser. No. 18/252,875, filed on May 12, 2023, which is a national stage of International Application No. PCT/IB2020/062601, filed Dec. 31, 2020, the entire disclosures of both of which are fully incorporated by reference herein for all purposes.

TECHNICAL FIELD

The present disclosure generally relates to communications networks. More particularly, and not by way of any limitation, the present disclosure is directed to a system, method, apparatus and associated computer readable media for facilitating handover management in a communications network configured to support dual connectivity (DC) involving multiple radio access technologies (RATs).

BACKGROUND

Mobile networks are rapidly evolving while the industry is struggling to keep up with the rising demand of connectivity, data rates, capacity, and bandwidth. Next Generation mobile networks (e.g., 5G New Radio (NR)) are particularly faced with the challenge of providing a quantum-change in capability due to the explosion of mobile device usage, expansion to new use-cases not traditionally associated with cellular networks, and the ever-increasing capabilities of the end-user devices. The requirements for 5G are also manifold, as it is envisaged that it will cater for high-bandwidth high-definition streaming and conferencing, to machine interconnectivity and data collection for the Internet-of-Things (IoT), and to ultra-low latency applications such as autonomous vehicles as well as augmented reality (AR), virtual reality (VR) or mixed reality applications, and the like. The evolution toward 5G mobile networks is also driven by the diverse requirements of a multitude of new use cases in the areas of enhanced mobile broadband (eMBB), ultra-reliable low-latency communication (URLLC) and massive machine-to-machine (M2M) communications, among others. Along with a demand for lower costs, these drivers have led to the development of various radio access network (RAN) architectures to support multiple deployment models.

For 5G systems to start delivering value immediately, initial components of the NR technology need to satisfy two urgent market needs, however: assisting 4G Long Term Evolution (LTE) deployments where substantial capital expenditures (CAPEX) and operational expenditures (OPEX) have been made; and strategic considerations with respect to the longer-term requirements of 5G. In this context, LTE-NR interworking is one of the most important technology components currently being developed. A key scenario for such interworking is widely considered to be LTE-NR dual connectivity (DC), in which user data can be exchanged between a mobile device (also referred to as a user equipment (UE) device) and an NR base station along with the LTE connectivity. Although advances in DC interworking continue to take place on various fronts, several lacunae remain, especially in the context of device handover, thereby requiring further innovation as will be set forth hereinbelow.

SUMMARY

The present patent disclosure is broadly directed to systems, methods, apparatuses, devices, and associated non-transitory computer-readable media for facilitating adaptive anchor layer mobility in a heterogeneous network implementation configured to support multi-RAT dual connectivity (MR-DC). In one arrangement, a handover modulation criterion involving relevant trigger parametrics of an anchor cell node serving a DC-connected UE and a target cell node selected for handover may be compared against a tunable threshold parameter indicative of the effect of the target cell on the anchor cell quality. If the handover modulation criterion does not exceed the tunable threshold value, a quality degradation prediction with respect to the UE may be executed to estimate a likelihood of service failure. Responsive to determining that the likelihood of service failure does not exceed a probability threshold, handover of the UE to the target cell may be suppressed, thereby facilitating a balance between the need to maximize secondary cell connectivity of the DC-connected UE (e.g., connected to an eNB node of the anchor/primary cell in 4G LTE and a gNB node of a secondary cell in 5G NR) and potential service degradation caused by the stronger target cell.

In one aspect, an embodiment of a handover (HO) management method performed by an anchor node serving a DC-connected UE is disclosed, wherein the anchor node is configured as a master node of a source cell operating in a first radio access technology (RAT) with respect to a secondary node operating in a second RAT, and the master node and the secondary node are connected via an inter-nodal interface. The method comprises, inter alia, receiving a measurement report from the UE, the measurement report containing information relating to one or more neighbor cells operating in the first RAT; and, responsive to the measurement report, selecting a particular neighbor cell as a target cell for handing over the UE. In one example arrangement, the method may include a determination that there is traffic with the secondary node over the inter-nodal interface. Responsive to determining that a handover modulation criterion exceeds a threshold value, the method may perform a handover of the UE to the selected target cell, e.g., according to a legacy procedure. Otherwise, responsive to determining that the handover modulation criterion is less than or equal to the threshold value, the method may perform a quality degradation prediction with respect to the UE to estimate a likelihood of service failure for the UE on the source cell (e.g., due to the effect of the neighbor/selected target cell). Responsive to determining that the likelihood of service failure does not exceed a probability threshold, the method may suppress handover of the UE to the target cell.

In one arrangement, an example quality degradation prediction scheme may be performed by a machine learning (ML) process comprising a trained artificial neural network (ANN), wherein a set of features pertaining to the anchor layer's RAT may be utilized in training the ANN. In one example arrangement, the likelihood of service failure resulting in quality degradation may be determined as a probability of radio link failure (RLF) associated with the UE due to the neighbor target cell. In one example arrangement, the anchor node may comprise an eNB node of 4G LTE technology and the secondary node may comprise a gNB node of 5G NR cellular technology, wherein the UE may be operative with a combination of (i) master cell group (MCG) radio bearers served by the eNB node, (ii) secondary cell group (SCG) radio bearers served by the gNB node, and (iii) split radio bearers served by both the eNB and gNB nodes, depending on the services consumed and/or sessions established. In one arrangement, an example handover modulation criterion may comprise a difference between the source cell's Reference Signal Received Power (RSRP) and the target cell's RSRP being greater than the tunable threshold value, which may comprise a neighbor cell interference parameter, by an offset. In another example arrangement, the handover modulation criterion may comprise a difference between the source cell's Reference Signal Received Quality (RSRQ) and the target cell's RSRQ being greater than the tunable threshold value, which may comprise a neighbor cell quality threshold, by an offset.

In still further aspects, one or more systems, network nodes, elements or apparatuses are disclosed, each comprising at least one processor and persistent memory having program instructions stored thereon, wherein the program instructions are configured to perform an embodiment of the methods set forth herein when executed by the respective at least one processor. In still further aspects, a computer program product comprising a non-transitory computer readable medium is disclosed, which is operative to store computer readable program code, the computer readable program code operable, when executed by processing circuitry to perform any of the methods set forth herein. Further features of the various embodiments are as claimed in the dependent claims.

Disclosed embodiments may provide one or more of the following technical advantages and benefits. For example, embodiments may be configured to maximize NR session time on 5G in an LTE-NR interworking network by optimizing the anchor LTE layer handover behavior such that the number of handovers may be minimized without sacrificing service quality. Because the NR session time is maximized, overall user experience with respect to 5G sessions/services delivered/consumed via NR legs is improved. By intelligently balancing handover decision-making against service level quality, e.g., on per-session and/or per-UE basis, embodiments herein advantageously reduce unnecessary handovers that place additional demands on the network, e.g., through consumption of radio channels/resources (e.g., Random Access Channels); through additional processing load in admission control, bearer setting and path switching; and have the potential to degrade the Quality of Service (QOS) of ongoing connections. Additionally, as a consequence of the overall reduction in handover procedures, UE resources, e.g., power, battery, processing/computing resources, radio resources, etc. may also be better conserved in at least some example embodiments.

These and other advantages will be readily apparent to one of skill in the art in light of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 2A-2C depict some example DC architectures operative within the network environment of FIG. 1B wherein a handover management scheme may be practiced according to some example embodiments;

DETAILED DESCRIPTION

Figure 1A:
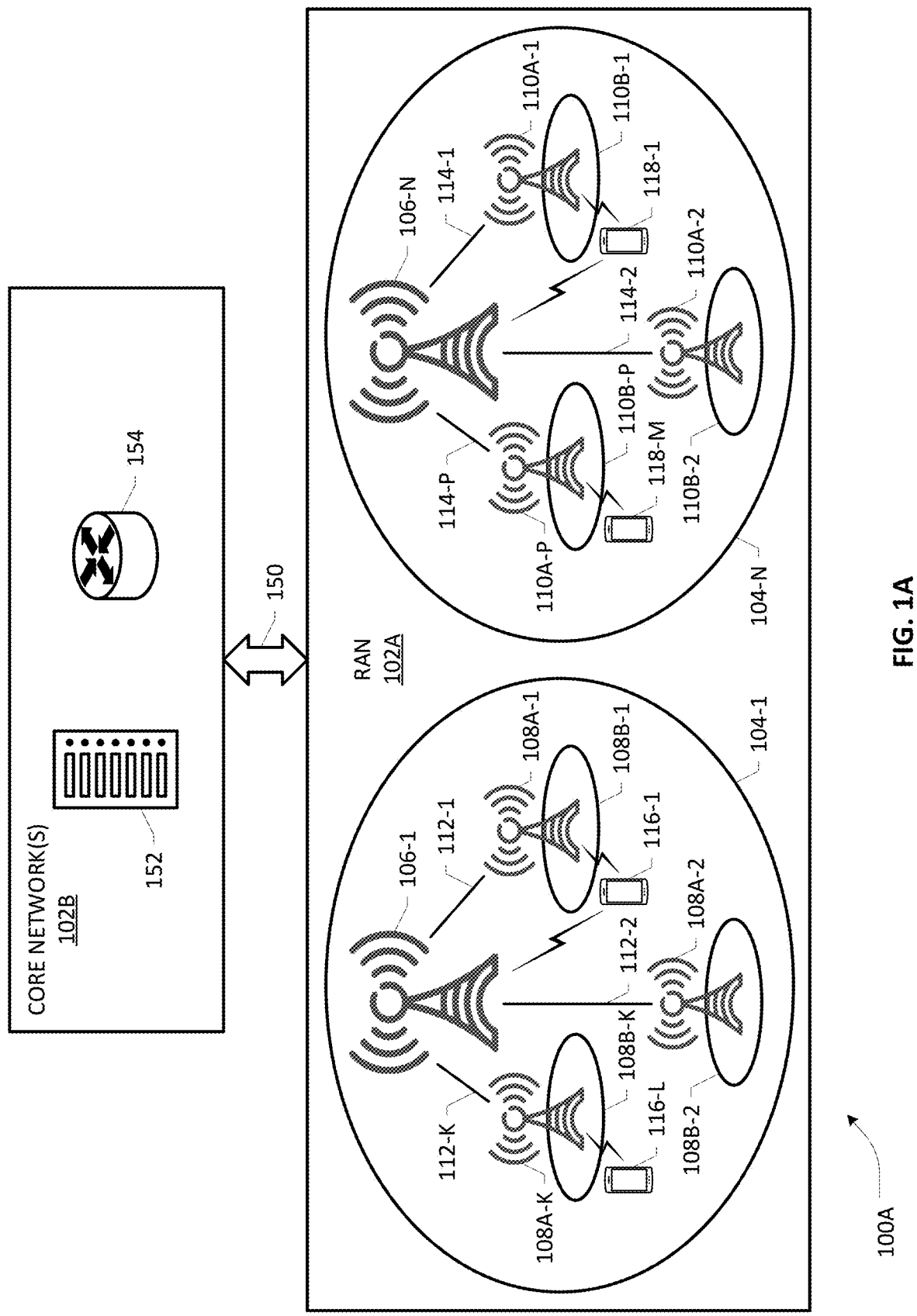
FIG. 1A depicts an example mobile communications network configured to support multi-RAT dual connectivity (MR-DC) wherein one or more embodiments of the present patent disclosure may be practiced in accordance with the teachings herein.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate, mutatis mutandis. Likewise, any advantage of any of the embodiments may apply to any other embodiments, and vice versa. Other objectives, features and advantages of the enclosed embodiments will be apparent from the following description.

As used herein, a network element, platform or node may be comprised of one or more pieces of service network equipment, including hardware and software that communicatively interconnects other equipment on a network (e.g., other network elements, end stations, etc.), and is adapted to host one or more applications or services with respect to a plurality of subscriber or users, and associated client devices as well as other endpoints, each executing suitable client applications configured to consume various data/voice/media services as well as sense/collect various types of data, information, measurements, etc. As such, some network elements may be disposed in a terrestrial cellular communications network, a non-terrestrial network (NTN) (e.g., a satellite telecommunications network including, inter alia, one or more communications satellites, high-altitude platform stations (HAPS)—which may be tethered or untethered, etc.), or a broadband wireline network, whereas other network elements may be disposed in a public packet-switched network infrastructure (e.g., the Internet or world-wide web, also sometimes referred to as the "cloud"), private packet-switched network infrastructures such as Intranets and enterprise networks, as well as service provider network infrastructures, any of which may span or involve a variety of access networks and core networks in a hierarchical arrangement. In still further arrangements, one or more network elements may be disposed in cloud-based platforms or data centers having suitable equipment running virtualized functions or applications relative to one or more processes set forth hereinbelow.

Example end stations and client devices (broadly referred to as User Equipment or UE devices) may comprise any device configured to consume and/or create any service via one or more suitable access networks or edge network arrangements based on a variety of access technologies, standards and protocols, including a heterogeneous network environment in some embodiments. Example UE devices may therefore comprise various classes of devices, e.g., multi-mode and/or dual-connectivity terminals adapted to communicate using terrestrial cellular communications infrastructure(s) based on different radio access technologies (RATs), WiFi communications infrastructure(s), or NTN communications infrastructure(s), or any combination thereof, which in turn may comprise smartphones, multimedia/video phones, mobile/wireless user equipment, portable media players, Internet appliances, smart wearables such as smart watches, portable laptops, netbooks, palm tops, tablets, phablets, IoT devices, connected vehicles (manual and/or autonomous), unmanned aerial vehicles (UAVs), and the like, as well as portable gaming devices/consoles including augmented reality (AR), virtual reality (VR) or mixed reality devices, etc., each having at least some level of radio network communication functionalities for accessing suitable RAN infrastructures according to some example implementations.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals-such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present patent disclosure.

Referring to the drawings and more particularly to FIG. 1A, depicted therein is an example mobile communications network 100A configured to support multi-RAT dual connectivity (MR-DC) wherein one or more embodiments of the present patent disclosure may be practiced in accordance with the teachings herein. A Radio Access Network (RAN) 102A may comprise a plurality of primary cells 104-1 to 104-N supported by respective base stations 106-1 to 106-N operating in a first RAT, wherein each primary cell may include one or more secondary cells effectuated by corresponding base stations operating in a second RAT. By way of illustration, primary cell 104-1 effectuated by base station or node 106-1 includes secondary cells 108B-1 to 108B-K, each effectuated by corresponding base stations or nodes 108A-1 to 108A-K, respectively. Likewise, primary cell 104-N effectuated by base station or node 106-N may include secondary cells 110B-1 to 110B-P, each effectuated by corresponding base stations or nodes 110A-1 to 110A-P. Depending on the particular access technologies implemented with respect to the primary and secondary cellular infrastructures, respectively, RAN 102A may be connected to one or more core networks 102B comprising a plurality of core network elements, e.g., elements 152, 154, via suitable signaling/data interfacing pathways 150 (e.g., the control plane or c-plane and user plane or u-plane pathways), that may be configured to effectuate various core network functionalities such as call control/switching, handover/mobility and roaming, charging, gateway access, service invocation, etc., relative to a plurality of subscribers served by respective primary and/or secondary cells of RAN 102A. Further, suitable backhaul network paths may also be provided in an example network arrangement in order to effectuate standards-based signaling/data interfacing between the primary cell nodes and corresponding secondary cell nodes for facilitating, inter alia, expanded coverage, efficient spectrum utilization, MR-DC functionality, etc., with respect to the subscriber UE devices served by the respective primary and/or secondary cells. As illustrated, primary cell node 106-1 is connected via inter-nodal backhaul paths 112-1 to 112-K to secondary cell nodes 108A-1 to 108A-K, respectively, and primary cell node 106-N is connected via inter-nodal backhaul paths 114-1 to 114-P to secondary cell nodes 110A-1 to 110A-P, respectively.

Skilled artisans will recognize upon reference hereto that example network arrangement 102A is illustrative of a heterogeneous wide area cellular communications network wherein multiple RATs and multiple types of access nodes may be implemented using a combination of cellular coverage areas, e.g., macrocells, small cells, microcells, picocells, and femtocells, etc., generally grouped as "macrocells" and "small cells," in order to offer wireless coverage in an environment with a wide variety of wireless coverage zones, ranging from an open outdoor environment to office buildings, homes, and underground areas. Illustratively, primary cells 104-1 to 104-N, comprising a first type of RAT infrastructure, may be operative as a plurality of macrocells, whereas respective secondary cells 108B-1 to 108B-K and 110B-1 to 110B-P, comprising at least a second type of RAT infrastructure, may be operative as corresponding pluralities of small cells, respectively, wherein tightly coordinated complex interoperation between macrocells and small cells may be effectuated to provide a mosaic of radio coverage, with handoff capability between network elements. In some configurations, therefore, example network arrangement 102A may be implemented as a multi-x environment—multi-technology, multi-domain, multi-spectrum, multi-operator and/or multi-vendor infrastructure(s)—with seamless interoperability to deliver assured service quality across the entire network, and having architectural flexibility that is reconfigurable enough to accommodate changing user needs, business goals and subscriber behavior, e.g., including the deployment of inter-generational RATs based on existing RATs and/or future RAT developments. Accordingly, it will be realized that in some embodiments primary cells 104-1 to 104-N may be based on any 2G/3G/4G/5G/NextGen (NG) RAT technologies according to applicable 3GPP standards and specifications, with corresponding secondary cells 108B-1 to 108B-K and 110B-1 to 110B-P based on any 2G/3G/4G/5G/NextGen RAT technologies different from that of the primary cells.

For purposes of the present patent disclosure, "dual connectivity" may be defined as the capability and functionality of a RAN infrastructure wherein a subscriber station or UE device can be simultaneously connected to two serving base stations, e.g., designated as a master node, MN (also synonymously referred to as an anchor node), and a secondary node, SN, operating in different RAT technologies, for effectuating respective service sessions. In some embodiments, a first service session may be effectuated via a primary cell node e.g., operating as the master node, for consuming and/or providing a first service type, whereas a second service session may be effectuated via a secondary cell node, e.g., operating as the secondary node, for consuming and/or providing a second service type, wherein the first and/or second service types may include but are not limited to services such as data, voice, gaming, streaming, multimedia, etc. As illustrated in FIG. 1A, a plurality of UE devices 116-1 to 116-L are exemplified with respect to primary cell 104-1, wherein UE 116-1 is shown as having a radio connection to primary cell node 106-1 as well as a radio connection to secondary cell node 108A-1. In similar fashion, a plurality of UE devices 118-1 to 118-M are exemplified with respect to primary cell 104-N, wherein UE 118-1 is shown as having a radio connection to primary cell node 106-N as well as a radio connection to secondary cell node 110A-1. It will be recognized that regardless of which RATs are utilized for the anchor nodes and corresponding secondary nodes in RAN 102A, or regardless of the types of services consumed via respective sessions, it is important that when a DC-connected UE roams from one primary/anchor cell to another, or obtains a better quality signal from a neighbor primary cell due to a change in the ambient radio environment, an optimized handover process is implemented such that neither service/session is unduly disrupted while suitable handoff procedures may be triggered pursuant to applicable standards and protocols relating to mobility management. Example embodiments for facilitating such a scheme will be set forth below in additional detail with particular reference to a communications network having inter-generational DC based on 4G LTE and 5G NR technologies. Skilled artisans will recognize, however, that the teachings of the present disclosure are not necessarily limited thereto, which may be equally applied in embodiments based on other existing RATs and/or future RATs, mutatis mutandis.

Figure 1B:
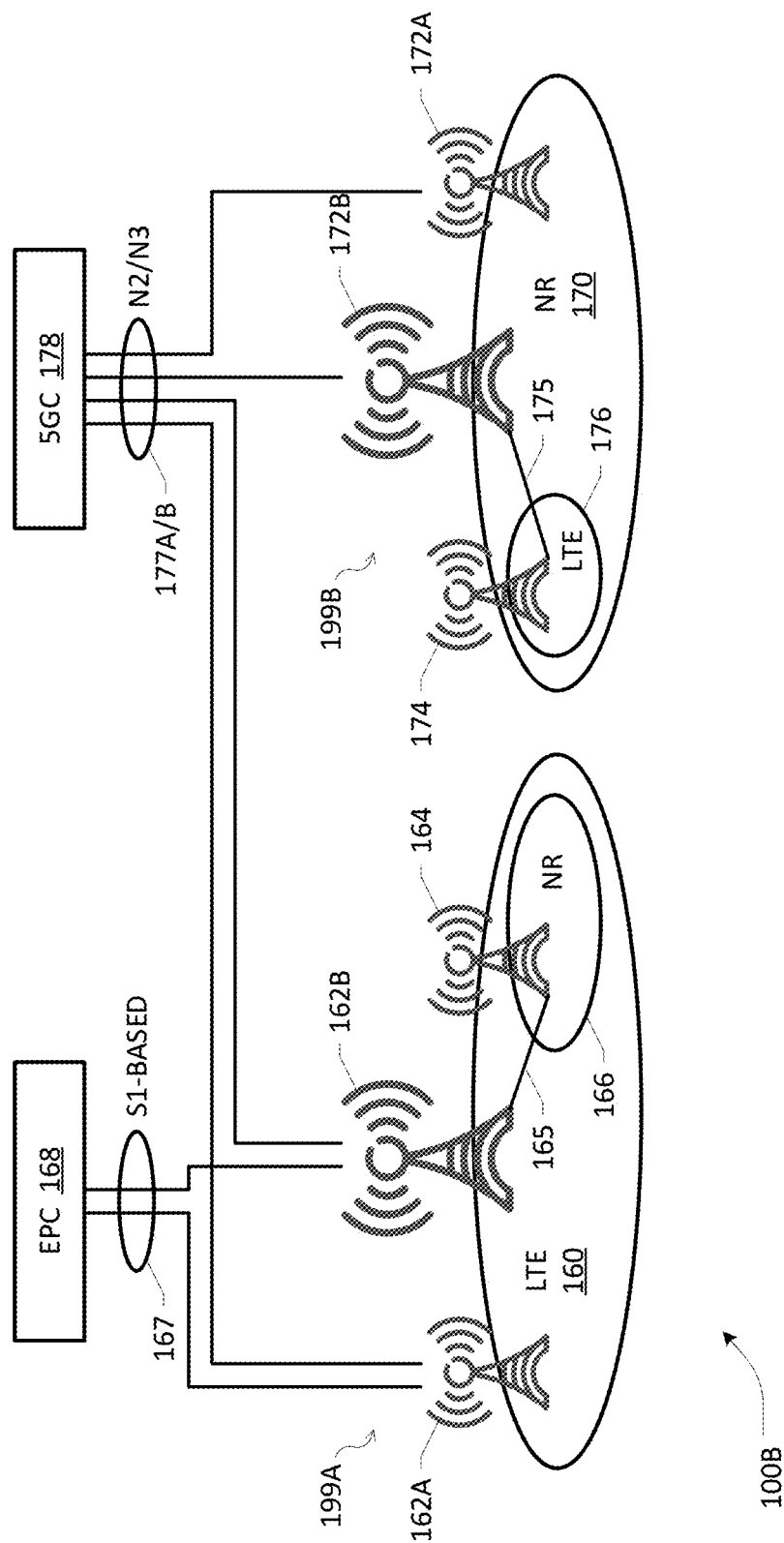
FIG. 1B depicts an example heterogeneous network environment with MR-DC based on LTE and 5G NR technologies wherein UE handover (HO) may be managed according to some embodiments.

FIG. 1B depicts an example heterogeneous network environment with MR-DC based on 4G LTE and 5G NR technologies wherein UE handover (HO) may be managed according to some embodiments. As illustrated, network environment 100B comprises two separate architectural representations of generalized network 100A described above, with 4G LTE infrastructure operating as an anchor layer in a first representation 199A and 5G NR infrastructure operating as an anchor layer in a second representation 199B. Representation 199A is exemplified with an LTE primary cell coverage area 160 effectuated by one or more eNB nodes 162A, 162B, wherein eNB node 162B is operative as an anchor/master node with respect to a 5G NR secondary cell 166 effectuated by a gNB node 164 operative as a secondary node. In analogous fashion, representation 199B is exemplified with a 5G primary cell coverage area 170 effectuated by one or more gNB nodes 172A, 172B, wherein gNB node 172B is operative as an anchor/master node with respect to an LTE secondary cell 176 effectuated by an eNB node 174 operative as a secondary node. In each network representation 199A, 199B, respective master nodes and corresponding secondary nodes may be connected via appropriate backhaul paths 165, 175, respectively, which may be configured to facilitate at least one of control signaling and/or user data flows with respect to one or more DC-connected UEs (not specifically shown in this FIG.) depending on implementation options. Further, appropriate signaling/user data pathways 167 may be established between the LTE infrastructure and a core network 168, e.g., Evolved Packet Core (EPC), which may comprise one or more nodes or elements such as, e.g., Mobility Management Entity (MME) nodes, Serving Gateway (SGW) nodes, Packet Data Network (PDN) Gateway (PGW) nodes, Home Subscriber Server (HSS) nodes, etc. Likewise, appropriate signaling/user data pathways 177A may be established between the 5G NR infrastructure and a core network 178, e.g., 5G Core (5GC), which may comprise one or more nodes or elements such as, e.g., User Plane Function (UPF), Session Management Function (SMF), Access and Mobility Management Function (AMF), etc. In a further arrangement, depending on the level of interworking between 4G LTE and 5G networks, appropriate signaling/user data pathways 177B may be established between the LTE infrastructure, e.g., LTE nodes 162A/B, and 5GC network 178. Skilled artisans will therefore recognize that a variety of network architectural combinations may be implemented for facilitating MR-DC, for example, depending on which RAT/RAN is configured as the anchor layer and/or which core network services are involved, wherein any of the network architectural combinations may be configured in accordance with applicable standards and/or specifications, e.g., 3GPP Technical Specification (TS) 37.340, which is incorporated by reference herein for all purposes. Accordingly, at least in some embodiments involving MR-DC, inter-nodal interfaces 165/175 may be implemented as X2 interfaces, interface 167 may be S1-based, and interfaces 177A/B may be implemented as N2/N3 interfaces. Regardless of which particular network architectural combination is implemented based on 4G LTE and 5G NR infrastructures, example embodiments herein may be configured to address the technical problem of managing triggered handover processes with respect to DC-connected UEs such that connectivity to secondary cells may be optimized in order to maintain expected levels of Key Performance Indicators (KPIs) such as high Quality of Service (QOS) and/or Quality of Experience (QoE) associated with 4G/5G services.

One example implementation option involving an LTE anchor layer with respect to 5G NR secondary cells, with an EPC core network, is known as Option 3 implementation, referred to as Evolved Universal Mobile Telecommunications System (UMTS) Terrestrial Radio Access (E-UTRA) NR DC or EN-DC, exemplified in FIG. 1B as representation 199A. In another implementation option, the anchor layer remains 4G LTE and the secondary cells remain 5G NR, but the core is a 5GC network (e.g., via interface 177A/B as shown in FIG. 1B). This implementation is known as Option 7, referred to as NG-RAN E-UTRA-NR DC (NGEN-DC). Yet another implementation option involves the anchor layer being 5G NR with 4G LTE secondary cells and EPC core, which is known as Option 4, referred to as NR-E-UTRA DC (NE-DC). Depending on how a 4G LTE infrastructure is utilized (e.g., for control plane anchoring) and the level of interworking involved, a 5G network deployment may be considered a Non-Standalone (NSA) implementation for purposes of some embodiments of the present disclosure. As will be seen below, some example embodiments particularly described in reference to certain EN-DC variations in a 5G NSA architecture may also be adapted in respect of other implementation options as well.

FIGS. 2A-2C depict some example EN-DC architectures that may be realized in a 5G NSA implementation consistent with at least a portion of the network environment of FIG. 1B wherein a handover management scheme may be practiced according to some embodiments. As described above, Option 3 architectural implementation involves a network having both LTE and NR radio access but using the EPC core of LTE to route control signals. In other words, a UE may be connected to an LTE master eNB node (MeNB) with respect to both user plane and control plane traffic whereas it is connected to a 5G secondary gNB node (SgNB) for user plane traffic only. In this arrangement, the UE may be connected to the LTE network first and then connected to the secondary NR infrastructure via a Radio Resource Control (RRC) Connection Configuration process. In one configuration of Option 3 exemplified by arrangement 200A of FIG. 2A, UE 202 is connected to MeNB 204 and SgNB 206, where X2 interface 208A between MeNB 204 and SgNB 206 is operative to carry both user plane and control plane traffic. MeNB node 204 is operative to interface with EPC infrastructure 210 with respect to both user plane traffic (via S1-U interface) and control plane traffic (via S1-C interface). In another variation 200B shown in FIG. 2B, referred to as Option 3a interworking mode, there is only control plane traffic via X2 interface 208B between MeNB 204 and SgNB 206, with the data traffic traversing S1-U interface disposed between SgNB 206 and EPC 210, e.g., SGW therein. In a further variation 200C shown in FIG. 2C, referred to as Option 3x, X2 interface 208C between MeNB 204 and SgNB 206 is operative to support a portion of LTE user plane traffic, in addition to an S1-U interface supporting user plane traffic directly between SgNB 206 and EPC 210. It will be realized that for Option 3, the traffic is split between 4G and 5G at MeNB 204; for Option 3a, the traffic is split between 4G and 5G at EPC (i.e., SGW); and for Option 3x, the traffic is split between 4G and 5G at SgNB 206. Further, although MeNB 204 and SgNB 206 are shown as separate nodes in FIGS. 2A-2C, some example implementations may integrate both LTE and NR base station functionalities into an integrated or co-located base station entity, with the inter-nodal X2 interfacing being an intra-component pathway in certain configurations.

Figure 3:
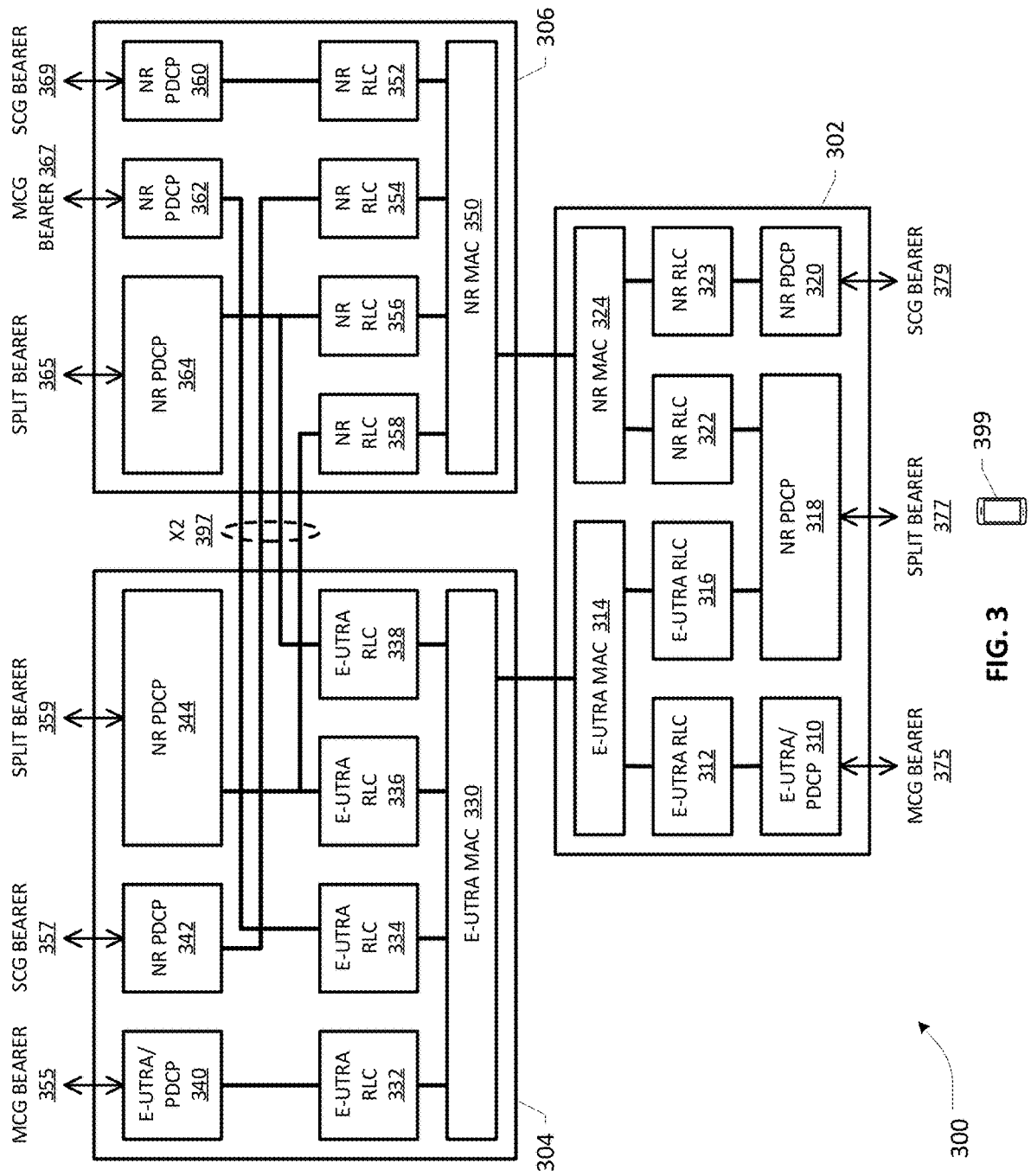
FIG. 3 depicts respective protocol layers or modules associated with a DC-capable UE device, an anchor node and a secondary node, respectively, in an example arrangement that may be adapted for facilitating UE handover according to an embodiment.

FIG. 3 depicts various protocol layers or modules associated with a DC-capable UE device, an anchor node and a secondary node, respectively, in an example architecture 300 that may be adapted for facilitating UE handover according to an embodiment. In an example EN-DC arrangement, LTE cells may be configured as a Master Cell Group (MCG) operative as an anchor layer whereas NR cells may be configured as a Secondary Cell Group (SCG). Because the LTE infrastructure is adapted as the anchor layer, a UE may be configured to perform initial registration with an anchor cell in the MCG, which can then add one or more secondary cells of the SCG. Whereas a UE may be communicating with both LTE eNB and NR gNB nodes on the radio side, i.e., the air interface, all the communications (signaling and data) are ultimately transported via the EPC network in example EN-DC implementations, with the CNB node operating as an anchor/master node and the gNB node operating as a secondary node. Accordingly, LTE eNBs and NR gNBs may use their own respective PHY/MAC layers with separate MAC scheduling in some arrangements. To support both the LTE and NR RRC control signaling, various types of signaling radio bearers (SRBs) may be used depending on the type of interworking: Master Cell Group (MCG) SRBs comprising direct SRBs between the master node and the UE device for conveying master node RRC messages that can also embed secondary node RRC configurations; split SRBs comprising SRBs split between the master node and the secondary node at a higher Layer 2 component, i.e., at Packet Data Convergence Protocol (PDCP) layer; and Secondary Cell Group (SCG) SRBs comprising direct SRBs between the secondary node and the UE device by which secondary node RRC messages may be sent. With respect to the user plane data traffic, various types of data radio bearers (DRBs) may likewise be used depending on the type of interworking: MCG DRBs comprising bearers terminated at the master node and using only the master node lower layers; MCG split DRBs comprising bearers terminated at the master node but that can use the lower layers of either the master node or secondary node, or both; SCG DRBs comprising bearers terminated at the secondary node and using only the secondary node lower layers; and SCG split DRBs comprising bearers terminated at the secondary node but that can use the lower layers of either the master node or secondary node, or both.

In the example architectural arrangement 300 shown in FIG. 3, Layer 2 protocol stack 302 associated with UE 399 is operative for supporting various bearers, e.g., MCG bearers 375, Split bearers 377 and SCG bearers 379. One or more PDCP, RLC and MAC layer components are provided as part of protocol stack or engine 302, where some of the protocol components are used exclusively for MCG bearers and SCG bearers, respectively, while other components may be shared for supporting Split bearers. As illustrated, E-UTRA PDCP component 310, E-UTRA RLC component 312 and E-UTRA MAC component 314 of UE protocol stack 302 are operative with respect to MCG bearer traffic. Likewise, NR PDCP component 320, NR RLC component 323 and NR MAC component 324 of UE protocol stack 302 are operative with respect to SCG bearer traffic. A shared NR PDCP component 318 may interoperate with either E-UTRA RLC 316, NR RLC 322, or both, with respect to Split bearer traffic.

In similar fashion, Layer 2 protocol stacks 304, 306 associated with a master eNB node and a secondary gNB node, respectively, may each comprise one or more PDCP, RLC and MAC layer components, where some of the protocol components are used exclusively for corresponding MCG bearers and SCG bearers, while other components may be shared for supporting Split bearers. Protocol stack or engine 304 associated with MeNB node is operative to support MCG bearers 355, SCG bearers 357 and Split bearers 359, and comprises E-UTRA MAC component 330, one or more E-UTRA RLC components 332-338, E-UTRA PDCP component 340, and one or more NR-PDCP components 342 and 344. Protocol stack or engine 306 associated with SgNB node is operative to support MCG bearers 367, SCG bearers 369 and Split bearers 365, and comprises NR MAC component 350, one or more NR RLC components 352-358, and one or more NR-PDCP components 360-364. An X2 interface 397 disposed between MeNB and SgNB nodes may be configured to carry inter-nodal Split bearer traffic as well as inter-nodal SCG/MCG traffic, depending on implementation.

As noted elsewhere in the present disclosure, it is important to define a suitable mobility strategy with respect to the anchor LTE bands/layers in an example 5G NSA implementation in order to ensure that 5G usability within a macrocell coverage zone is maximized. It should be appreciated that this condition or requirement can be challenging as the underlying LTE protocol layers are typically optimized over a period of time so as to provide seamless QoS/QoE on LTE. However, such an arrangement may be suboptimal because 5G NR session continuity is largely influenced by anchor LTE mobility. In current LTE/NR implementations, mobility in the anchor LTE layer triggers a release of SN-terminated Split bearer (e.g., the DRB traffic over NR), which causes it to be reconfigured again after completing a handover process in LTE through suitable mechanisms (e.g., based on configuration or responsive to certain LTE measurement reports such as B1 measurement reports). In a typical post-successful EN-DC connection setup scenario, the NR leg release may be triggered by both MeNB and SgNB nodes. For example, SgNB-triggered EN-DC NR leg releases may be caused in response to detecting a Radio Link Failure (RLF) by the gNB node. MeNB-triggered EN-DC NR leg releases may be due to a variety of causes such as degradation in source cell performance caused by, e.g., UE-detected random access failure, RLC Uplink (UL) delivery failure, out of synchronization condition, etc., as well as LTE mobility/handover.

With respect to an example LTE mobility/handover scenario, it is relevant to note that when a neighbor cell with better radio conditions is found, the neighbor cell may be reported by the UE through a suitable measurement report, e.g., RRC Measurement Report, as per fulfillment of applicable respective event criteria. As such, various LTE mobility scenarios are possible within the same carrier and/or different LTE carriers, where inter-frequency mobility events may trigger an evaluation of both source and neighbor cells against static configurable thresholds. On the other hand, intra-frequency mobility events may trigger an evaluation based only on neighbor cell's radio conditions i.e., differences in radio measurements (e.g., Reference Signal Received Power (RSRP), Reference Signal Received Quality (RSRQ), etc.) between the source cell and neighbor cells are compared against certain parameters such as a3Offset and hysteresis, and if the neighbor cells remain stronger for a duration greater than timetotrigger value, the UE sends an A3 measurement report to the source eNB node requesting handover to a suitable candidate cell (i.e., a target cell). Such a handover, however, may cause NR service disruption because of the latency involved in reestablishing the NR leg in association with the target cell anchor node, which may or may not involve a different NR cell.

Figure 4A:
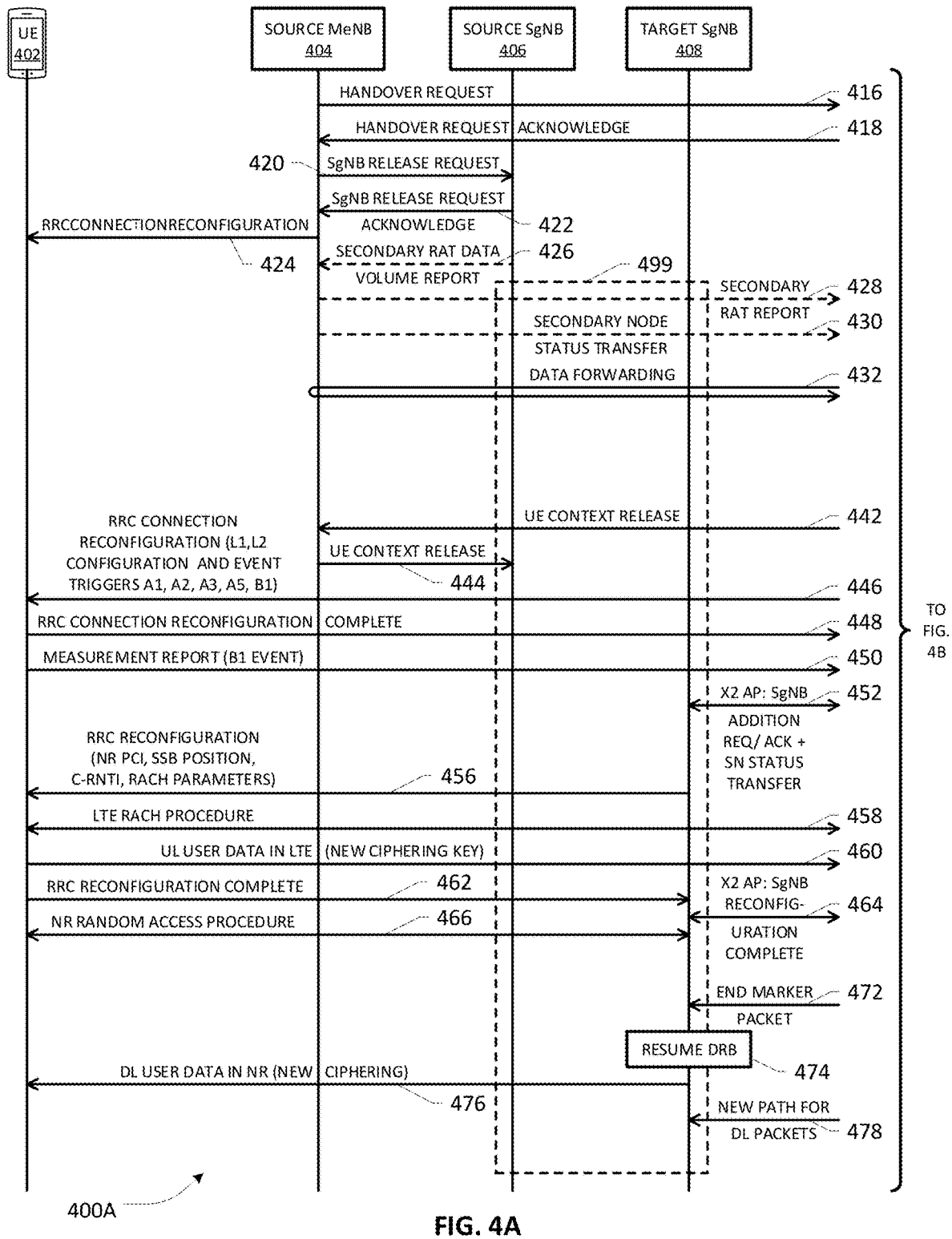
FIGS. 4A and 4B cumulatively depict a message flow diagram associated with a network arrangement having an LTE eNB node as a master/anchor node and a 5G gNB node as a secondary node for effectuating UE mobility wherein an embodiment of the present patent disclosure may be practiced for reducing service disruption.
Figure 4B:
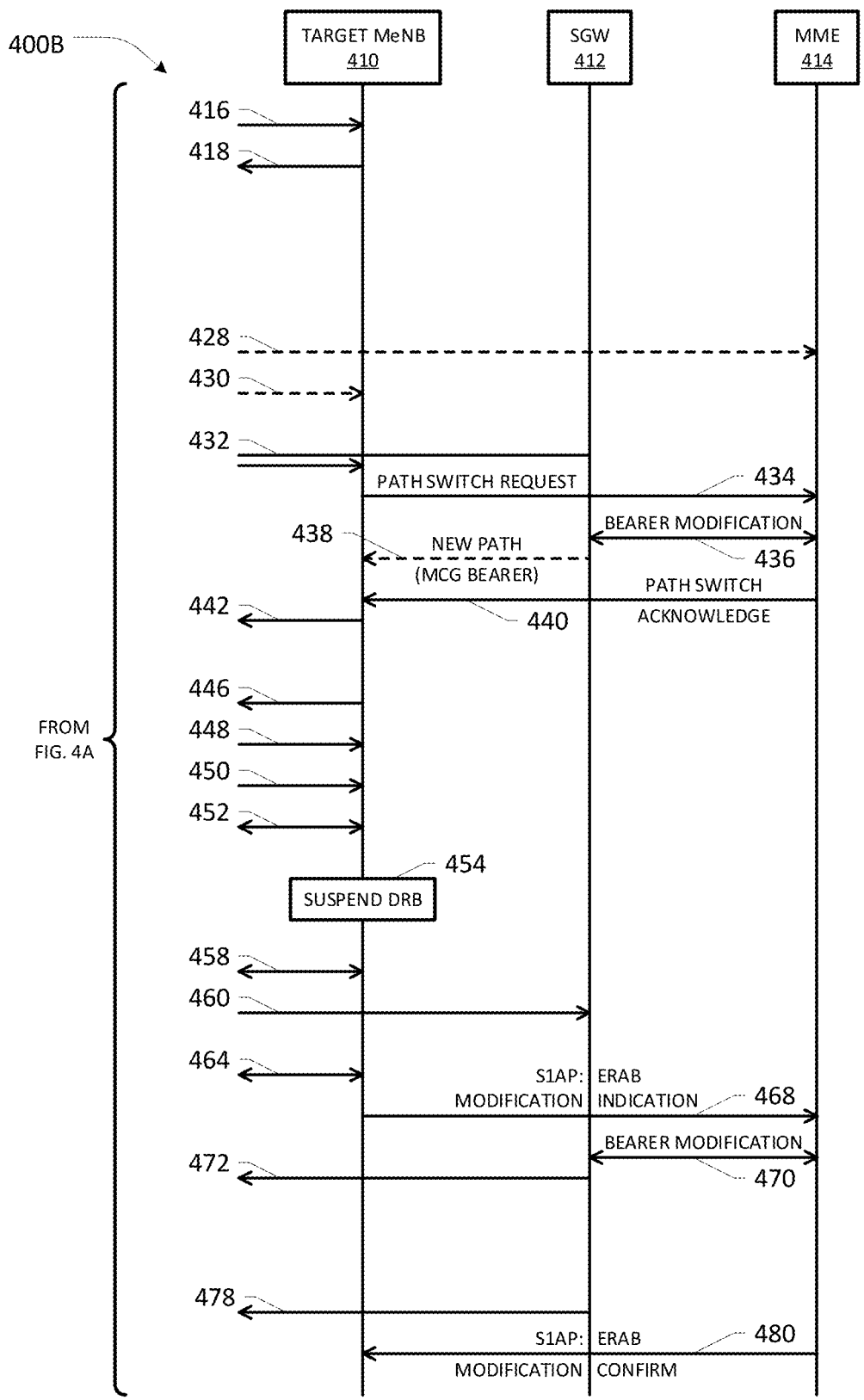

FIGS. 4A and 4B cumulatively depict a message flow diagram 400A/B associated with a network arrangement comprising an LTE eNB node as a master/anchor node and a 5G gNB node as a secondary node, wherein NR service disruption may be caused due to a handover in the LTE anchor layer. In one implementation, message flow diagram 400A/B is illustrative of a procedure that may be executed when a stronger LTE intra-frequency neighbor cell is reported by a UE 402 operating in an EN-DC network environment. In response, a source/anchor eNB 404 may be configured to evaluate applicable criteria for mobility based on a conditionality defined as follows:

$$M(n) + CIO - Hyst > M(s) + a3Offset \quad \text{(Eqn. 1)}$$

where M(n)=strength of neighboring cell, M(s)=strength of serving cell, CIO=Cell Individual Offset, and Hyst=Hysteresis.

In one arrangement, the foregoing conditionality may be evaluated based on certain parameters, e.g., timetotrigger, and with respect to applicable trigger quantity, such as RSRP, RSRQ, etc. Responsive to the identified target eNB, e.g., target MeNB 410, source MeNB 404 triggers a Handover request to target MeNB 410 and initiates an SgNB release request towards associated SgNB 406. After successful LTE handover, UE context is released in both source MeNB 404 and associated SgNB 406. In one arrangement, UE 402 may be configured with one or more LTE mobility triggering event details (e.g., A1, A2, A3, A5, B1, etc.) in the new MeNB 410. If the new MeNB 410 supports EN-DC configuration, UE 402 may be configured to measure suitable NR cell(s) for EN-DC setup and report via a B1 measurement report. Responsive to finding appropriate NR cell(s), the B1 measurement report may be sent by UE 402 indicating the measured NR cell(s). Responsive thereto, the new anchor MeNB 410 may trigger an SgNB addition procedure with the strongest reported NR cell (e.g., subject to the condition that the NR cell is defined as a valid candidate with supporting IP connectivity definitions). Thereafter, the established DRB traffic is suspended with source SgNB 406. Following a successful Random Access Channel (RACH) procedure for the LTE and NR cells, UE 402 may establish the Split bearer and resume the NR session, e.g., downlink (DL) data, over the new NR leg with target SgNB 408.

Example message flow diagram, comprising portions 400A and 400B, sets forth the foregoing interactions in additional detail. Responsive to identifying target MeNB 410, a Handover request 416 is generated by source MeNB 404, which is propagated to target MeNB 410 in accordance with LTE procedures. An Acknowledgement 418 may be received by source MeNB 404 in response thereto. Responsive to Acknowledgement 418, an SgNB Release Request message 420 may be generated by source MeNB 404 towards SgNB 406 associated therewith, followed by an Acknowledgement message 422. An RRCConnectionReconfiguration message 424 may be generated by source MeNB 404 towards UE 402. A Secondary RAT data volume report 426 may be obtained by source MeNB 404 from source SgNB 406. In response, a Secondary RAT report 428 may be generated by source MeNB 404 towards MME 414. Also, a Secondary Node (SN) Status Transfer message 430 may be generated by source MeNB 404 towards target MeNB 410. A Data Forwarding message 432 may be propagated from SGW 412 to target MeNB 410 via source MeNB 404. Target MeNB 410 then generates a Path Switch Request message 434 towards MME 414. In response, a Bearer Modification message 436 is generated by MME 414 towards SGW 412, which sends a New Path message 438 for the MCG bearer to target MeNB 410. Further, MME 414 may also generate a Path Switch Acknowledgement message 440 towards target MeNB 410. A UE Context Release message 442 may be generated by target MeNB 410 towards source MeNB 404, which in turn propagates a UE Context Release message 444 towards associated SgNB 406. An RRC Connection Reconfiguration message 446 with suitable Event Triggers, e.g., A1, A2, A3, A5, B1, etc., as noted above, may be generated by target MeNB 410 towards UE 402. Responsive thereto, an RRC Connection Reconfiguration Complete message 448 may be generated by UE 402 towards target MeNB 410.

A Measurement Report 450 (e.g., based B1 Event, which measures or otherwise indicates if a secondary neighbor NR cell is of stronger signal strength/quality by a threshold) may be generated by UE 402 towards target MeNB 410. Thereafter, X2-based messaging may take place between target MeNB 410 and associated target SgNB 408 with respect to requesting to add a new SgNB, associated Acknowledgement, and SN Status Transfer, cumulatively indicated as messaging 452. Target MeNB 410 suspends DRBs as indicated at block 454. Target SgNB 408 sends an RRC Reconfiguration message 456 with appropriate parameters (e.g., NR Physical Cell ID or PCI, Synchronization Signal Block (SSB) position, RACH parameters, etc.) to UE 402, which engages in an LTE RACH procedure 458 with target MeNB 410. An Uplink (UL) user data in LTE may be generated by UE 402 towards SGW 412, indicated as message flow 460. Thereafter, an RRC Reconfiguration Complete message 462 may be generated by UE 402 towards target SgNB 408, which in turn generates an SgNB Reconfiguration Complete message 464 towards target MeNB 410 via X2 interface. An NR RACH procedure 466 may take place between UE 402 and target SgNB 408. An Evolved-UTRAN Radio Access Bearer (ERAB) Modification Indication 468 may be generated by target MeNB 410 towards MME 414, responsive to which a Bearer Modification messaging process 470 may take place between MME 414 and SGW 412. An End Marker Packet may be provided by SGW 412 via flow 472 to target SgNB 408, which commences/resumes DRB traffic as indicated at block 474. Thereafter, a Downlink (DL) user data in NR may be provided by target SgNB 408 via flow 476. A New Path for DL packets may be provided to target SgNB 408 by SGW 412, as indicated by flow 478. An ERAB Modification Confirm message 480 may be generated by MME 414 towards target MeNB 410 which is operative as the new anchor node after completion of handover.

It will be appreciated that call flow segment 499 indicated in message flow diagram 400A/B is illustrative of a typical NR service interruption that may be caused in response to the anchor LTE handover instigated by source MeNB 404. As can be seen from example message flow diagram 400A/B, the overall impact on user experience may vary significantly in an actual network implementation depending on the latency of several air interface procedures involved in the call flow, e.g., such as LTE and NR RACH procedures. Whereas current 5G NSA implementations involving dual connectivity can faithfully execute HO trigger-based handover procedures according to LTE, thereby potentially causing frequent service disruptions and concomitant quality degradation in NR services (e.g., due to the reduction of the overall time that a UE is connected to the NR leg), it has been observed that such handovers are effectuated even in good quality radio conditions (e.g., both serving/source and target LTE cells have good coverage and signal quality, with the target cell being better by an offset). Accordingly, to maximize the time NR sessions remain uninterrupted in spite of the instigation of LTE anchor layer handovers, embodiments herein provide a system and method for facilitating a predictive approach with respect to conditions under which service degradation may be expected to exceed a configured threshold and allowing a handover only when the predicted service degradation in the anchor layer reaches or crosses the degradation threshold (e.g., by a margin). In other words, a technical effect of some embodiments herein is to reduce the number/frequency of anchor layer handovers in an MR-DC network implementation, whereby user experience with respect to 5G sessions/services delivered/consumed via NR legs is improved. Further, as a consequence of the overall reduction in HO procedures, UE device resources, e.g., power, battery, processing/computing resources, radio resources, etc. may be better conserved in at least some example embodiments.

Broadly, example embodiments may be effectuated based on what may be referred to as "session level mobility triggering adjustment" where a failure predictor process may be implemented for estimating, determining, or otherwise obtaining a satisfactory operating point of the serving LTE anchor cell for an ongoing EN-DC session of a served UE. As long as the UE is operating in the satisfactory zone, an example embodiment may be configured such that a handover process that would otherwise have been triggered due to a mobility measurement report, e.g., an A3 intra-frequency mobility report, an A5 inter-frequency mobility report, etc., is suppressed so that no handover will be initiated. In some embodiments, subsequent measurement reports may be evaluated against dynamically modified thresholds that may be obtained, calculated, or otherwise estimated in various ways. In some example embodiments, further modulation may be provided such that while suppressing handover, additional interference is not caused in or due to the strongest reported neighboring cell using suitable interference margin thresholds. It will be appreciated that such HO process modulation allows an evaluation of every session to be performed based on each session's merit and determine the most suitable LTE handover threshold based on the current operating point of the serving cell with respect to each served UE. In some example embodiments, a machine learning (ML) process may be implemented for estimating, predicting, or otherwise obtaining quality degradation based on RLF probability that may be used in determining a satisfactory operating zone with respect to an ongoing session. In some aspects relating to ML-based failure prediction, an example embodiment may be implemented based on a deep learning model that may be realized using an artificial neural network (ANN) process. In some further embodiments, an example ANN-based RLF predictor may use a federated architecture to train the process using cellular data obtained from different networks and/or different regions that may undergo data preprocessing. In still further embodiments involving ANN-based RLF prediction, a suitable feature selection process with respect to training, testing and validating an RLF predictor may be employed.

Regardless of whether ML-based RLF prediction and/or other methods for obtaining quality degradation prediction are employed in a handover management process for suppressing anchor layer HO operations while the UE is in a satisfactory operating zone in an anchor cell, example embodiments introduce a handover criterion comprising a tunable parameter that may be applied in addition to existing HO trigger processes. In one arrangement, the tunable parameter may comprise a neighbor cell's interference on a serving/anchor cell, which may be verified against a suitable parametric difference between the anchor cell and the neighbor cell. It will be realized that depending on implementation, such parametric differences may be obtained relative to a variety of cell parameters, e.g., RSRP, RSPQ, etc. Depending on the applicable threshold's verification against the tunable handover criterion, which may also be referred to as a handover modulation criterion, a handover suppression criterion, handover avoidance criterion, or other terms of similar import, RLF/quality degradation prediction may be selectively instigated to determine whether a handover should be initiated. Additional details relating to various aspects of the foregoing embodiments are set forth below.

Figure 5A:
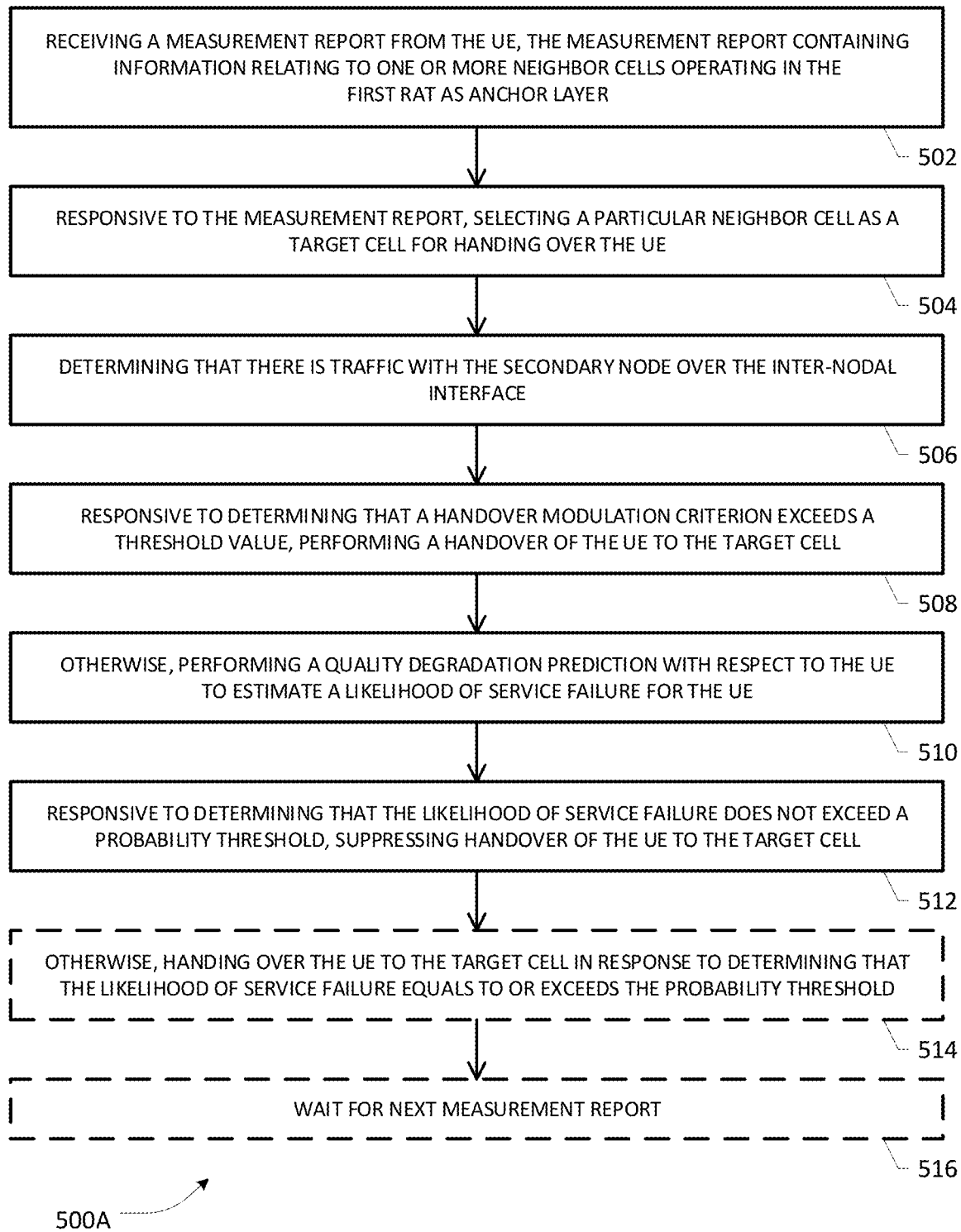
FIGS. 5A and 5B depict flowcharts of various blocks, steps and/or acts that may be (re)combined in one or more arrangements, with or without additional flowcharts of the present disclosure, for effectuating UE handover/mobility according to some embodiments of the present patent disclosure.
Figure 5B:
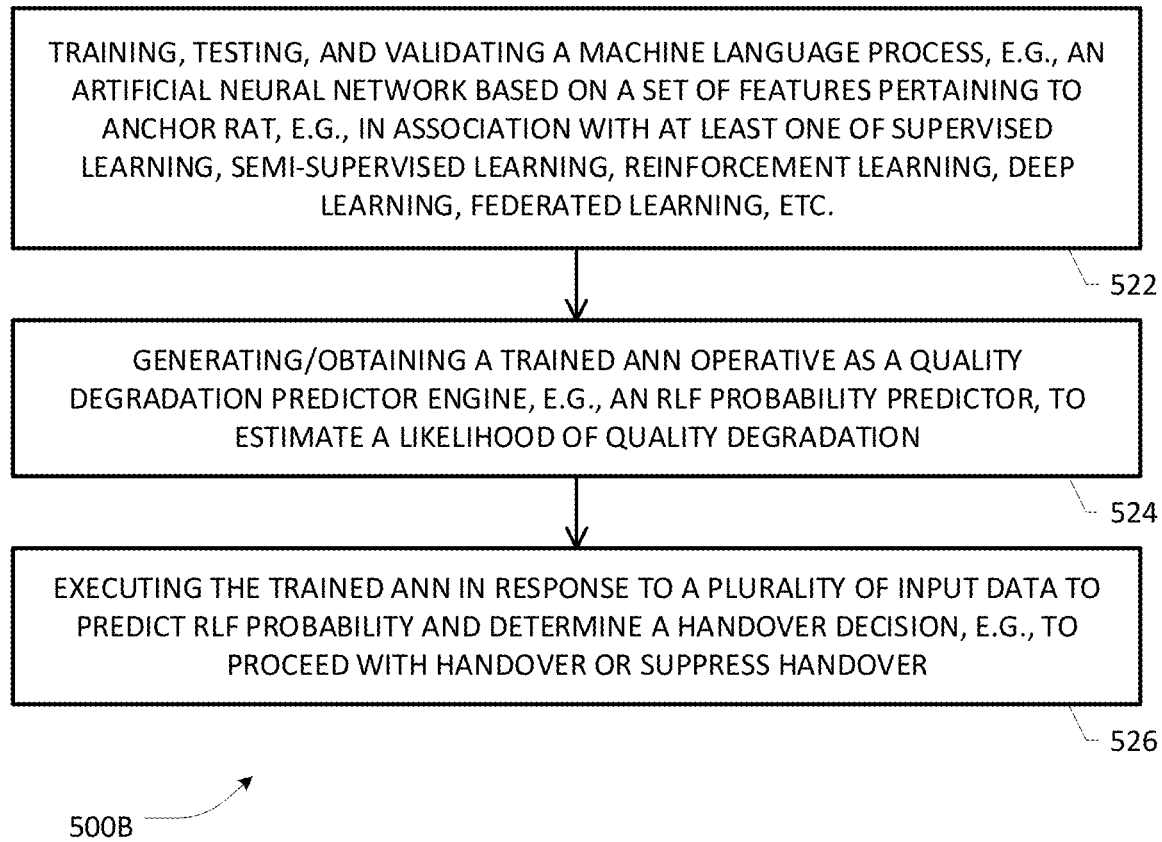

FIGS. 5A and 5B depict flowcharts of various blocks, steps and/or acts that may be (re)combined in one or more arrangements, with or without additional flowcharts of the present disclosure, for effectuating UE handover/mobility modulation according to some embodiments of the present patent disclosure. Process 500A shown in FIG. 5A is exemplary of a handover management method that may be performed by one or more processors of an anchor node (e.g., 4G LTE eNB node) serving one or more dual connectivity (DC) UE devices. As previously discussed, the anchor node may be configured as a master node of a source cell operating in a first RAT with respect to a secondary node operating in a second RAT, wherein the master node and the secondary node may be connected via an inter-nodal interface. In some embodiments, process 500A may be executed on a session-by-session basis and/or per UE basis. At block 502, a measurement report may be received from a UE device, the measurement report containing information relating to one or more neighbor cells operating in the first RAT as an anchor layer. At block 504, responsive to the measurement report, a particular neighbor cell may be selected as a target cell for handing over the UE device. At block 506, a determination may be made that there is traffic with the secondary node over the inter-nodal interface. Responsive to determining that a handover modulation criterion exceeds a threshold value, a handover of the UE device to the target cell may be performed (block 508). Otherwise, responsive to determining that the handover criterion does not exceed the value, a quality degradation prediction (e.g., based on RLF probability) may be performed with respect to the UE device to estimate a likelihood of service failure for the UE device on the serving cell (e.g., due to the effect of the selected neighbor target cell) as set forth at block 510. Responsive to determining that the likelihood of service failure does not exceed a probability threshold, handover of the UE to the target cell may be suppressed (block 512). Otherwise, responsive to determining that the likelihood of service failure exceeds the probability threshold, in some embodiments, a handover of the UE device to the target cell may be initiated (block 514). In one arrangement, if the UE handover is suppressed as set forth at block 512, process 500A may continue to wait for a next measurement report from the UE device (block 516).

In some embodiments, one or more aspects of quality degradation prediction as set forth at block 510 may be performed as an ML-based RLF prediction process, wherein a suitable ML process or engine may be trained, tested and validated, as previously noted. Process 500B of FIG. 5B is exemplary of an ML-based scheme with respect to a handover decision modulation process according to an example embodiment. At block 522, various operations regarding training, testing, and validating an ML-based failure prediction process, e.g., an ANN, may be performed based on a set of features pertaining to the anchor RAT. In one arrangement, such operations may be performed as an offline process that may be executed at the anchor node, at another network node (e.g., a network management node), or at a cloud/data center facility. In one arrangement, one or more ML or artificial intelligence (AI) techniques may be executed in conjunction with the training of the ML process. Skilled artisans will recognize that such techniques may comprise, without limitation, at least one of supervised learning, semi-supervised learning, reinforcement learning, deep learning, and/or federated learning, etc. At block 524, a trained ANN model operative as a quality degradation predictor engine may be generated or otherwise obtained, which is based on RLF probability prediction, to estimate a likelihood of quality degradation. The trained ANN engine may be executed, in response to a set of input variables comprising online and/or real-time data obtained at the anchor node with respect to a particular UE upon receiving a measurement report, to predict RLF probability and determine a handover decision with respect to the UE, e.g., to proceed with handover or suppress handover, as set forth at block 526. Additional details regarding an example ANN engine for predicting RLF probability in an LTE/NR network environment will be set forth further below with respect to certain embodiments of the present patent disclosure.

Figure 6A:
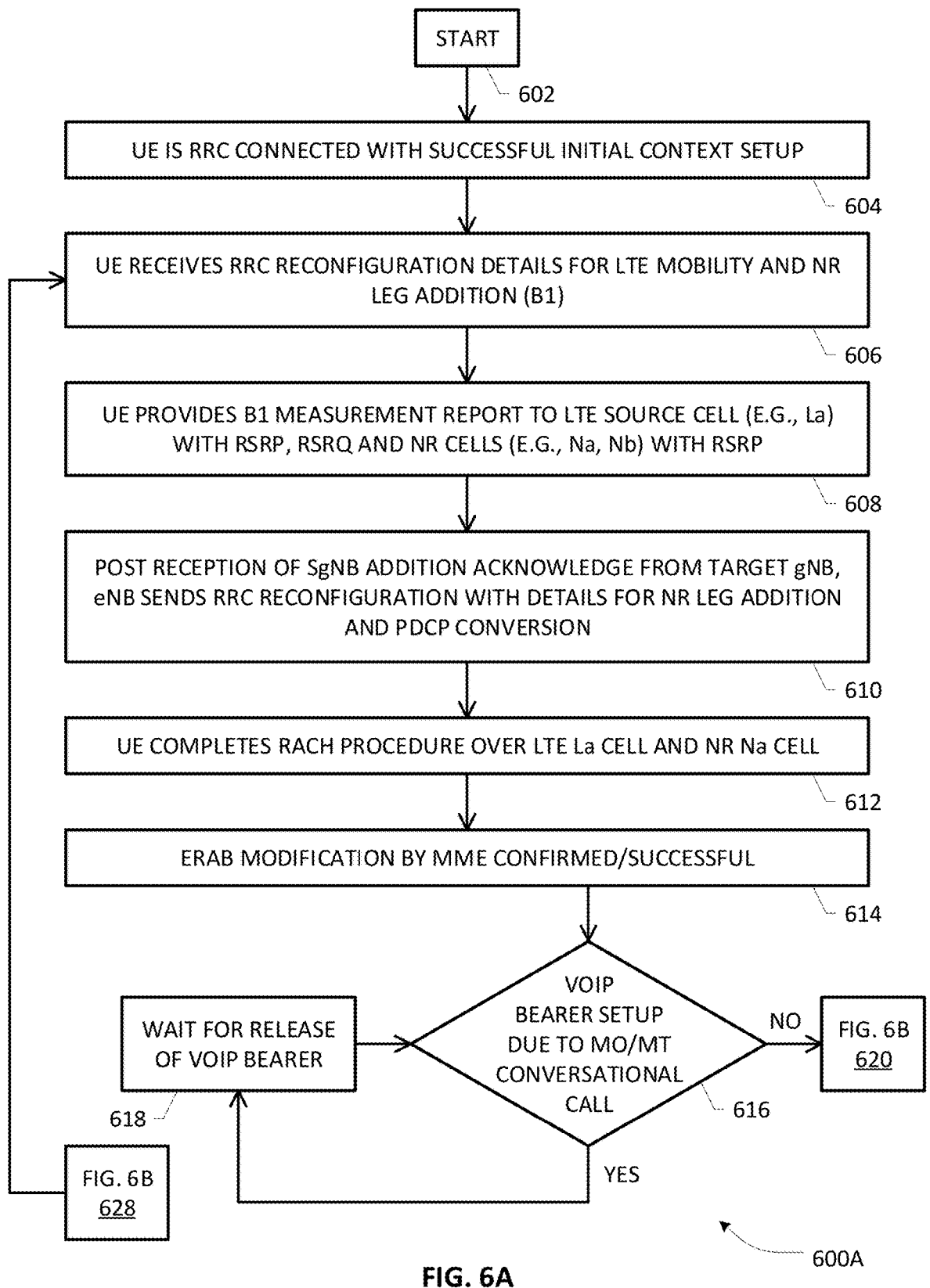
FIGS. 6A and 6B cumulatively depict a flowchart of various blocks, steps and/or acts that may be (re)combined in one or more arrangements, with or without additional flowcharts of the present disclosure, for effectuating UE handover/mobility according to some embodiments of the present patent disclosure.
Figure 6B:
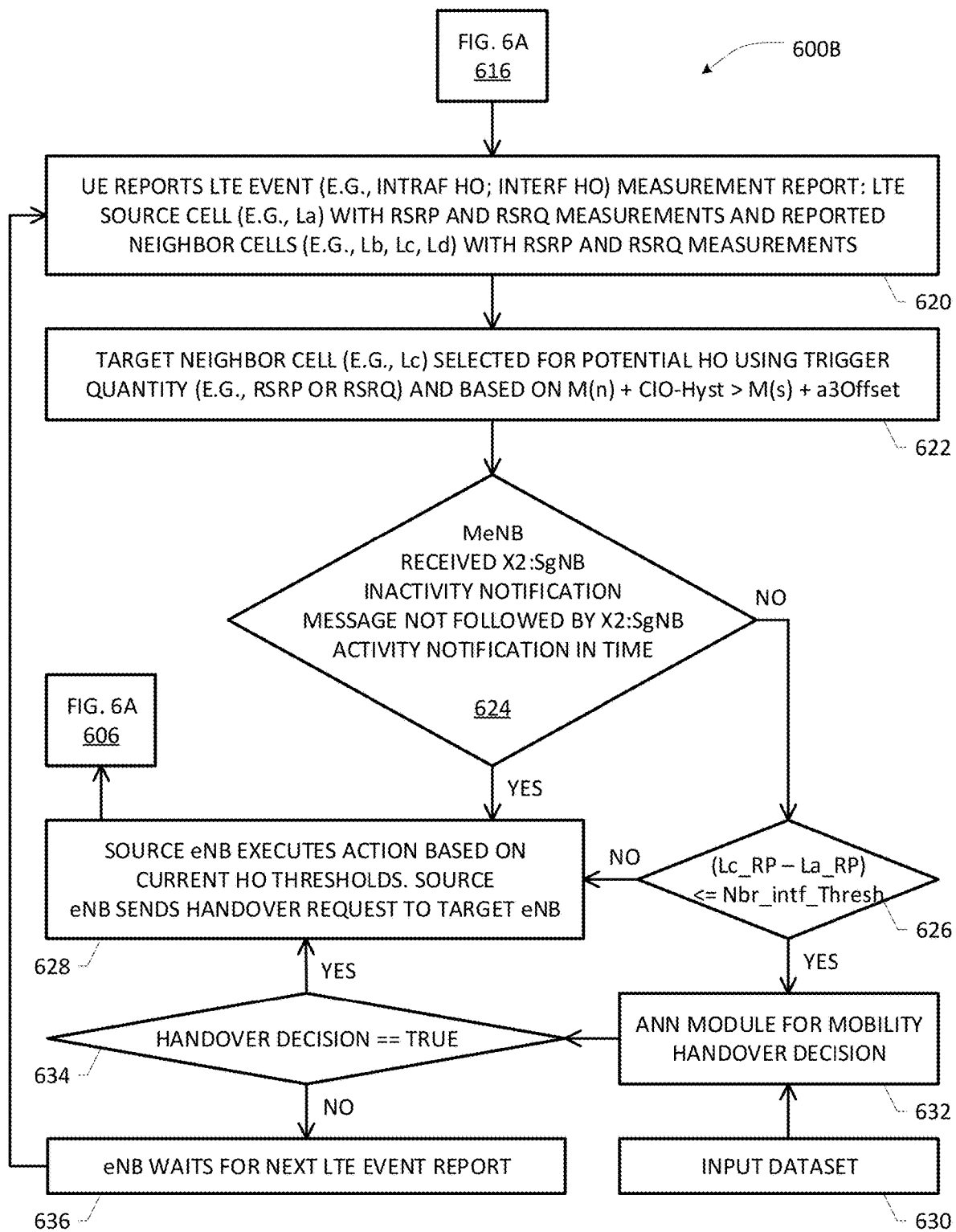

FIGS. 6A and 6B cumulatively depict a flowchart of various blocks, steps and/or acts that may be (re)combined in one or more arrangements, with or without additional flowcharts of the present disclosure, for managing and/or modulating UE handover/mobility according to some embodiments of the present patent disclosure involving EN-DC Option 3x interworking in a 5G NSA implementation. In general, an example process comprising a plurality of stages may be described as follows in one operational context having a UE connected to an LTE anchor cell (La), with LTE RRC signaling connection and an established MCG bearer, wherein the source eNB configures the UE with event triggers for mobility (e.g., A1, A2, A3, A5, A6, and B1). For EN-DC, UE may be configured with B1 event and respective b1 threshold, which any measured NR cell must satisfy in order to be added as SCG. As an example, NR Cell (Na) may be considered as meeting the B1 event criteria.

(A) MeNB triggers SgNB addition procedure to add Na. Based on the acknowledgement received from SgNB, MeNB sends LTE and NR Reconfiguration details to UE, which in one arrangement mainly comprises details to initiate the lower layer signaling procedure to reserve RAN resources over LTE and NR.

(B) UE performs Random Access Channel (RACH) procedure over LTE and NR followed by SgNB Reconfiguration complete, resulting in successful establishment of SCG Split bearer. As per DC Option 3x, DL PDUs may be sent over NR leg unless radio quality of NR is worse than configurable Signal-to-Interference-and-Noise Ratio (SINR) thresholds. In one arrangement, DL PDUs can also be sent using NR and LTE Carrier Aggregation (CA) depending on data volume in DL PDCP buffer of SCG.

(C) In one embodiment, example process may be configured to exclude radio bearers for real time services (e.g., with guaranteed bit rate (GBR) requirements) in order to prevent any perceptible performance degradation. For example, MeNB verifies if a QoS Class Identifier (QCI) 1 voice bearer is established and active; and if so, legacy behavior may follow for anchor LTE mobility procedure.

(D) UE sends a measurement report (e.g., an A3 Intra-frequency or A5 Inter-frequency measurement report) listing neighboring LTE cells which are evaluated and found to be stronger than the serving cell based on RSRP or RSRQ and configured thresholds.

(E) Based on successful evaluation of A3 handover criteria, serving LTE cell (La) identifies the strongest reported LTE cell (Lc). In one arrangement, Equation (1) set forth previously may be applied in this stage as an HO evaluation condition:

$$M(n) + CIO - Hyst > M(s) + a3Offset$$

where M(n)=strength of neighboring cell, M(s)=strength of serving cell, CIO=Cell Individual Offset, and Hyst=Hysteresis.

(F) MeNB checks if the SCG NR leg is active (e.g., having data in SCG Packet Data Convergence Protocol (PDCP) buffer) by monitoring the SgNBInactivity Notification, which is an X2 interface message, for a predefined time window (t_SgNBInactivity). If MeNB did not receive any SgNB Activity notification X2 message within this duration, La may be configured to trigger a Handover request towards Lc since NR leg is already inactive. In such a scenario, a legacy handover process for LTE may be executed.

(G) If SCG NR leg is determined to be active (e.g., no SgNB Inactivity Indication received within a preconfigured or configurable time), the RSRP difference between neighbor Lc and source La is compared with a Nbr_Intf threshold parameter by way of implementing a handover modulation criterion. In one arrangement, Nbr_Intf threshold may be configured as a tunable parameter used to determine if Lc's strength is significantly stronger (e.g., >>a3Offset) than that of La, which can potentially create high DL interference for connected UEs in Lc thereby causing performance/quality degradation.

(H) If the difference is greater than Nbr_Intf threshold, a handover may be initiated towards Lc following legacy handover procedure. On the other hand, if the difference is less than Nbr_Intf threshold, a further verification may be performed to determine if the current operating point/range in the source cell (i.e., La cell) is conducive to maintain satisfactory connection quality and reliability. As noted previously, an ML-based process (set forth further below with additional details) may be executed to determine the probability of a negative event (e.g., RLF) affecting the LTE radio link integrity based on the current operating point of La and decide whether to proceed with handover towards Lc based on the latest measurement report sent by UE. In one arrangement, at least a subset of the variables of the latest measurement report may correspond to a feature set used in training, testing and validating the ML-based ANN engine configured to operate as the RLF predictor engine in a handover management/modulation scheme of the present patent disclosure.

(I) The ML-based predictor process may be configured to return a Boolean result, and if it is True, MeNB (i.e., source La cell node) triggers a handover towards identified target cell (Lc), which may be executed in accordance with legacy LTE procedures. If the outcome is False, MeNB ignores the current measurement report and performs no handover action based on the last measurement report (i.e., referred to as handover suppression or handover avoidance).

Example process portions 600A and 600B shown in FIGS. 6A and 6B taken together illustrate the foregoing stages in a flowchart form with further details according to an embodiment. Upon commencing the process flow (block 602) and where a UE is RRC-connected with successful initial Context Setup (block 604), the UE receives RRC Reconfiguration details for LTE mobility and NR leg addition (e.g., in a B1 report), as set forth at block 606. At block 608, the UE provides the B1 measurement report to the LTE source cell (e.g., La cell), the cell having certain RSRP, RSPQ values, along with one or more NR cells, e.g., Na, Nb, having respective RSRP values. After reception of SgNB Addition Acknowledgement message from a target gNB, La cell's eNB node sends RRC Reconfiguration with details for NR leg addition and PDCP conversion (block 610). Thereafter, RACH procedures may be completed by the UE with La cell and selected NR Na cell over LTE and NR air interfaces, respectively, as set forth at block 612. An ERAB Modification Confirm message is received by La cell eNB from LTE core MME node (block 614). In one arrangement, an iterative loop may be optionally executed to ensure that if there is a VoIP call (Mobile-Originated (MO) or Mobile-Terminated (MT) call) or another GBR bearer service is active, it is completed or released prior to processing any measurement reports from the UE, as set forth at blocks 616, 618. If there is no GBR service and/or the GBR service is no longer active, process 600A/B flows to block 620 where an LTE Event (e.g., IntraF HO or InterF HO, etc.) may be reported from the UE and received by La cell. Applicable parameters may comprise, e.g., La cell with RSRP and RSRQ measurements and one or more reported Neighbor (Nbr) cells (e.g., Lb, Lc, Ld cells) with respective RSRQ/RSRP measurements. Depending on implementation, a Trigger quantity may be RSRQ or RSRP, or any other suitable quality/performance indicator, or any combination thereof. Further, depending on applicable conditionalities, e.g., Equation (1) described above, a target Nbr cell may be selected/identified for potential handover. By way of illustration, Lc is selected as the target Nbr cell, whereupon additional checks and conditionalities may be verified between source La cell and target Lc cell, as set forth at block 622.

In one arrangement, example process 600A/B may involve an optional determination as to whether there is any activity on the X2 interface between source La eNB node and associated NR Na cell. Such activity (e.g., signaling and/or data traffic) may be monitored over a preconfigured or configurable period of time based on suitable timers/counters and notifications, as exemplified at block 624. In one example implementation, if MeNB of La cell receives an inactivity message which is not followed by an activity notification within a time period t_SgNBInactivity (e.g., so as to provide a guard band), i.e., there is no X2 activity for a period of time, a legacy LTE handover procedure (e.g., based on measurement report and current handover thresholds) may be executed for handing the UE over to target Lc cell, wherein source eNB sends a HO Request to target eNB, as set forth at block 628. Thereafter, control may flow to block 606 wherein appropriate NR leg addition procedure may be executed by Lc cell, now operating as the anchor cell for EN-DC.

If there is SgNB activity reported/monitored within a configurable time period, example process 600A/B may involve verification of one or more performance/quality related conditionalities as between the La and Lc cells against a tunable handover conditionality parameter that may be set based on ML techniques in some embodiments. As noted previously, RSRPs of La and Lc cells may be compared against the Nbr_Intf threshold parameter, and if the difference is greater than Nbr_Intf threshold, a handover may be initiated towards Lc following legacy handover procedure (shown at block 626 and 628). If Lc cell is not stronger than La by a certain threshold (e.g., Nbr_Intf threshold), process 600A/B flows to an ML process for further verification as noted previously (blocks 626, 632). It will be appreciated that in the example embodiment set forth herein, if there is no SgNBInactivity indication received by master eNB (anchor node) within a time period, the intention is to retain the connection on La source cell even if there is a stronger Nbr cell, thereby facilitating a balance between the need to maximize the NR connectivity and potential service degradation caused by the stronger Nbr cell. Accordingly, if the UE reports a target cell Lc that is stronger based on the parameters set forth above, the comparison of difference between Source (La) and Neighbor/target cell (Lc) RSRP with Nbr_Intf threshold identifies the potential target cell as an extremely stronger cell and if the HO is not initiated, the high interference from Lc neighbor cell would continue to impact La source cell performance experienced by the UE. To avoid such scenarios, example embodiments advantageously implement the Nbr_Intf threshold tunable parameter on top of existing CIO and a3offset based conditionalities to further modulate the HO behavior of the anchor network in a 5G NSA implementation.

At block 632, an ANN engine is operative responsive to a set of input data 630 obtained from, e.g., one or more UE measurement reports, including a latest report, any of which may be differently weighted, for predicting RLF probability and providing a Boolean decision in response. If the handover decision is True (block 634), a legacy handover may be executed (block 628), whereupon the new anchor cell may perform appropriate NR leg addition procedures (block 606). Otherwise, process 600A/B may enter a state of inactivity until a next measurement report is received, as set forth at block 636. Depending on implementation, subject to one or more additional determinations, e.g., no active GBR service, source La cell may continue with another iteration of a modulated HO decision process as set forth herein.

It will be apparent that the foregoing HO decision modulation process may be adapted to various types of architectural implementations described earlier in the present disclosure in reference to FIG. 1B. For example, with the evolution in radio access technology and higher spectral efficiency achievable in NR, NSA deployment with Option 3 involves an anchor node deployed as LTE eNB, secondary node deployed as NR gNB, with EPC most commonly deployed as the core. Accordingly, EN-DC capable UEs within NR coverage experience a gain in throughput and latency performance against legacy LTE service experience. Along the same lines, a technical benefit of the embodiments herein is to reduce the user-plane interruption caused by NR release triggered due to LTE anchor layer HO. Some embodiments comprehended in FIGS. 6A/6B may therefore be suitably configured bearing in mind current NSA NR deployments in different market areas across operators.

Some example embodiments herein are equally applicable to an Option 7 network implementation (exemplified in FIG. 1B), where anchor node remains as LTE eNB, secondary node remains as NR gNB, but core network evolves to 5G Core. Due to the similarity of the anchor layer architectures between Option 3 and Option 7, it should be appreciated that frequent LTE mobility could impact the user's NR session continuity in Option 7 also in a similar fashion. Accordingly, some embodiments of FIGS. 6A/6B may be adapted to an Option 7 implementation as well, mutatis mutandis.

For Option 4, anchor node is NR gNB, secondary node is LTE eNB and EPC is deployed as the core. Whereas some embodiments of the present patent disclosure may also be adapted in such an architecture as well, the gain in terms of end user throughput may not be as significant as Option 3 or Option 7 because anchor node is NR gNB and identification of a satisfactory operating point/range for which RLF probability is low, and only beyond which NR HO should be triggered that may reduce the overall interruption in NR user plane to some extent.

Figure 7:
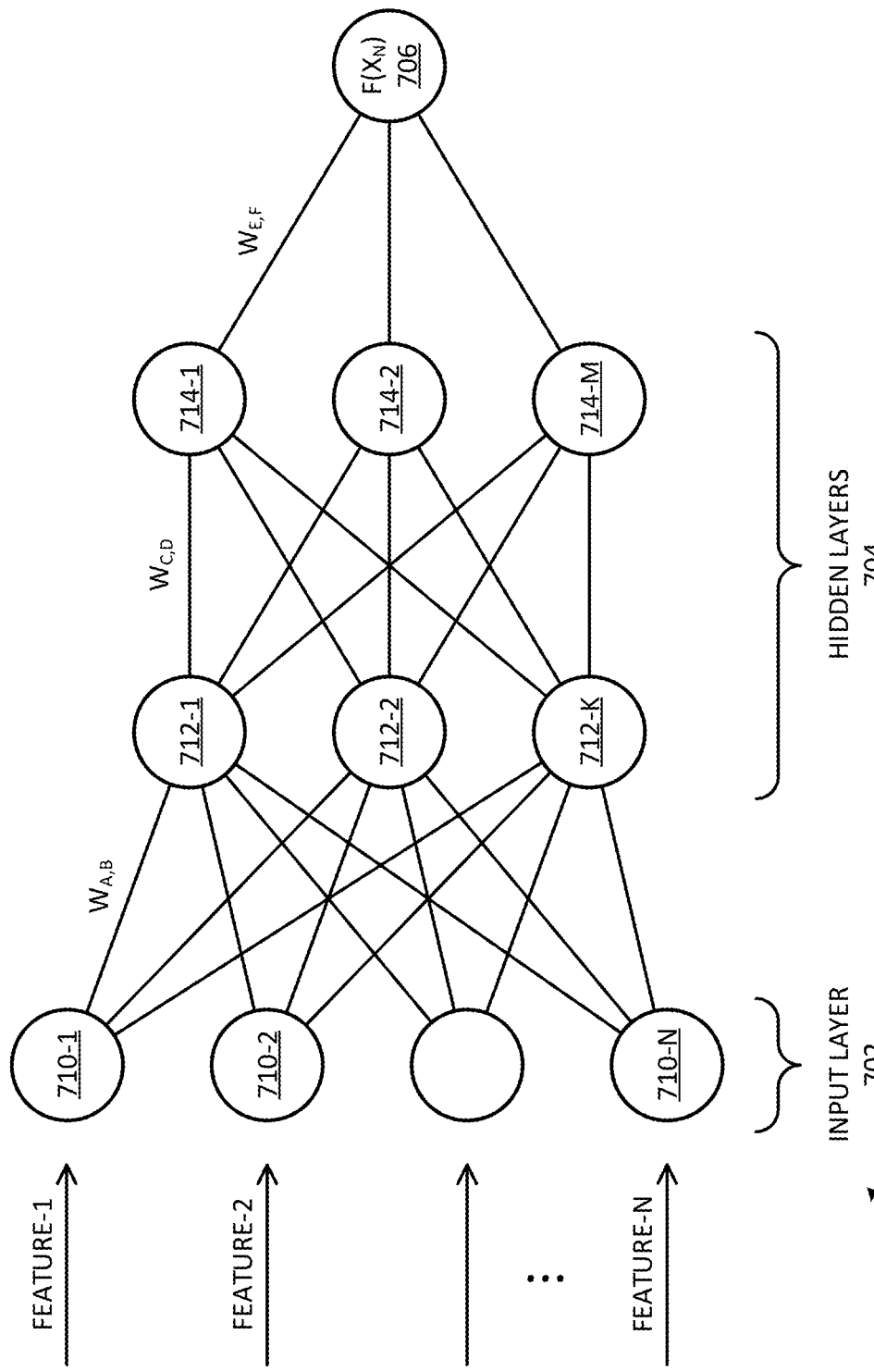
FIG. 7 depicts a generalized artificial neural network (ANN) model operative as a machine learning (ML) process for predicting radio link failure for purposes of an example embodiment of the present patent disclosure.

Directing attention to FIG. 7, depicted therein is an example generalized artificial neural network (ANN) model 700 operative as a machine learning (ML) process for predicting radio link failure for purposes of an embodiment of the present disclosure. As exemplified, ANN model 700 is operative in response to a plurality of radio network features (Feature-1 to Feature-N), which may be selected based on their relevance to a network radio link failure, wherein each selected feature is provided to a corresponding input "neuron" or computational node 710-1 to 710-N, that forms part of an input layer 702. Typically, ANN model 700 may be configured such that the nodes of the input layer 702 are passive, in that they do not modify the data. Rather, they receive a single value on their input, and duplicate the value to their respective multiple outputs, which may depend on the connectivity of the ANN model 700. One or more hidden layers 704 may be provided for reducing the dimensionality of the input feature parametric space, wherein each of hidden nodes 712-1 to 712-K and 714-1 to 714-M are active, i.e., they modify the incoming data received from the prior layer nodes and output a value based on a functional computation involving weighted incoming data. In a fully interconnected ANN structure, each value from an input layer may be duplicated and sent to all of the hidden nodes. Regardless of the extent of the interconnectivity, the values entering a hidden node at any given hidden layer are multiplied by weights, which comprise a set of predetermined numbers stored in the engine that may be "learned" in a series of iterative stages involving, e.g., output error back propagation or other methodologies. At each respective hidden node, the weighted inputs are added to produce a single intermediate value, which may be transformed through a suitable mathematical function (e.g., a nonlinear function) to generate an intermediate output within a normalized range (e.g., between 0 and 1). Depending on the number of hidden layers, weighted intermediate outputs may be provided to a next layer, and so on, until reaching at least one single active output node 706, which may be configured to generate an output that may be thresholded to provide an indication of a condition (dependent variable) based on the input data.

Whereas neural networks can have any number of layers, and any number of nodes per layer, an example ANN model 700 may be configured with a fairly small number of layers, comprising only a portion of the size of the input layer. In the example arrangement shown in FIG. 7, two hidden layers and an active output layer are shown, with inputs to first and second hidden layer nodes being modulated by weights $\{W_{a,b}\}$ and $\{W_{c,d}\}$ respectively, and inputs to the output node being modulated by weights $\{W_{e,f}\}$. The weights required to make example ANN model 700 carry out a particular task, e.g., RLF probability prediction, may be found by a learning algorithm, together with examples of how the system should operate in certain implementations.

Figure 8:
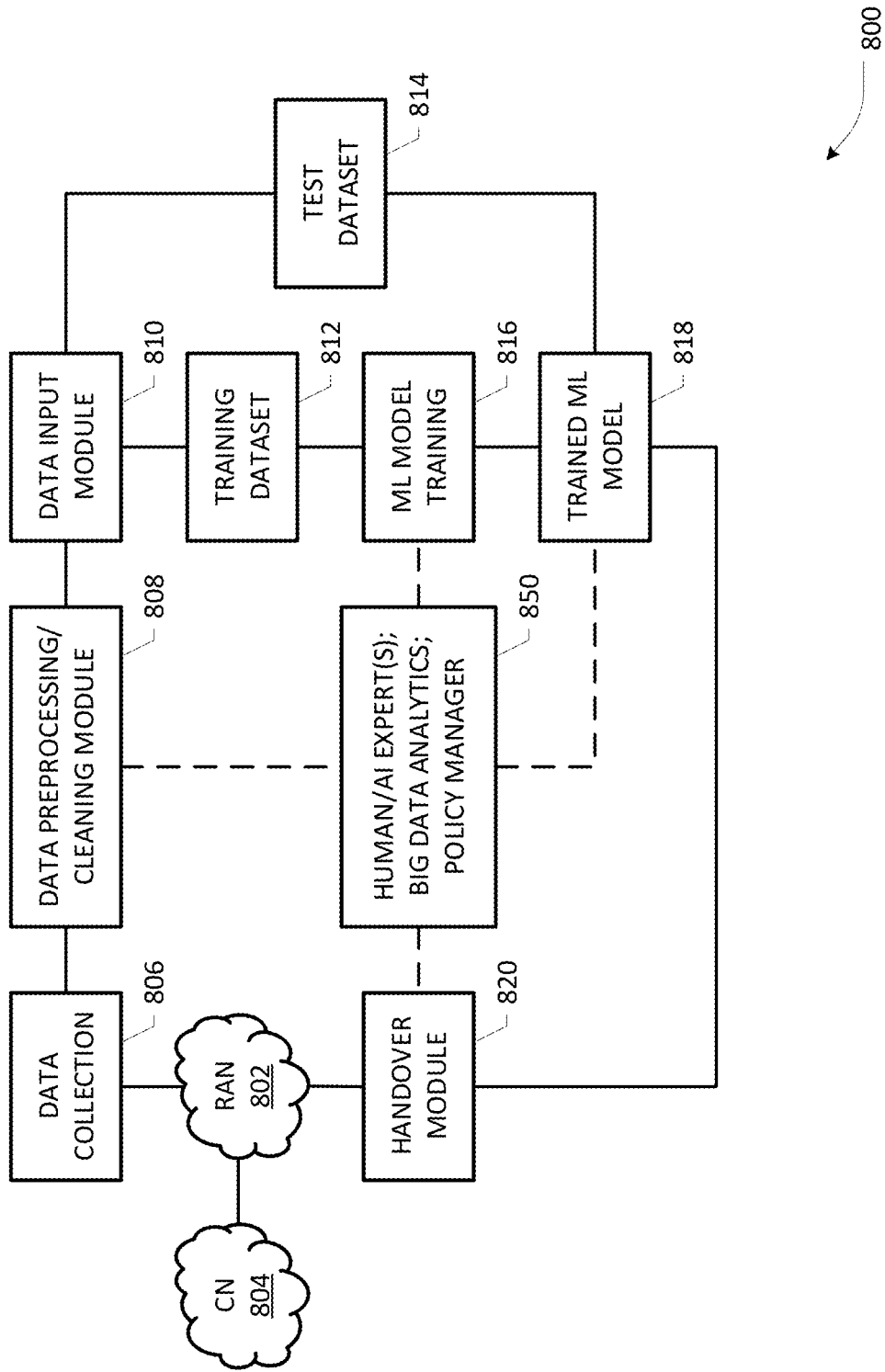
FIG. 8 depicts a block diagram of an apparatus, node, or network element functionality associated with a network portion for training, testing and generating a validated ANN process or engine operative in conjunction with a UE handover/mobility scheme for purposes of an example embodiment of the present patent disclosure.

FIG. 8 depicts a block diagram of an apparatus, node, or network element functionality 800 associated with a network portion for training, testing and generating a validated ANN process or engine operative in conjunction with a UE handover/mobility scheme for purposes of an example embodiment of the present disclosure. As illustrated, one or more radio access network (RAN) portions 802 and one or more core network (CN) portions 804 exemplify a representative mobile communications system configured to support an MR-DC architecture implementation described above. A data collection module 806 is operative to obtain data relating to a number of performance metrics, parameters or other variables, which may be measured, monitored, obtained, estimated, or otherwise determined for a number of RAN infrastructure elements of RAN 802, wherein the data may be collected periodically, e.g., responsive to a scheduler, or based on occurrence or detection of events, triggers, alarms, etc., or based on operator/management node policies, and the like. Further, the data may be collected via different techniques for different types of variables, RAN infrastructure elements, and the like, e.g., via pull techniques, push techniques, or a combination thereof. A data preprocessing or cleaning module 808 is operative to perform data cleaning operations, steps, acts, or functions, which may be guided/unguided or supervised/unsupervised, by human or AI-based experts 850 having knowledge and domain expertise relative to the RAN infrastructure, with respect to the input data obtained by the data collection module 806. In some embodiments, different types of data preprocessing may be implemented depending on the types of data collected in RAN networks, wherein the data can comprise categories such as cardinal data, nominal data, ordinal data, rank order data, continuous variable data, discrete variable data, categorical data, Boolean data, and the like. Further, some data cleaning operations may involve imputation of missing values with values determined based on statistical distributions of the data. Accordingly, a modified dataset may therefore be generated by the data preprocessing/cleaning module 808, which may include input by a data input module 810 as one or more training datasets 812 to a specific ML/ANN model for predicting certain performance or quality related events (e.g., RLF) associated with or relative to one or more infrastructural elements of RAN 802 (e.g., eNB nodes). Depending on the particular ML implementation architecture associated with the network, ML model training 816 may involve one or more iterations, which in some instances may include (semi)supervised learning based on input from human/AI experts, such that a trained ML model 818 that is appropriately fitted is obtained i.e., resulting in a model without under-fitting or over-fitting. In one embodiment, the foregoing operations may be provided as part of the ML training stage or aspect of an example implementation. In a subsequent or separate phase, the fitted/trained ML model 818 may be used in conjunction with additional datasets of RAN 802 that may also be preprocessed or cleaned by module 808, whereby suitable test datasets or validation datasets 814 may be used as input data for generating predictive output relative to one or more performance events in a further example implementation. As one skilled in the art will recognize, at least a portion of the foregoing operations may be performed offline and/or by different network entities depending on implementation. After training, testing and validating the ML/ANN model 818, it may be executed in conjunction with a suitable network element or functionality, e.g., a handover management module 820 associated with at least a RAN/eNB element, for providing appropriate handover decisions with respect to modulating a node's handover behavior in accordance with teachings herein.

Some example embodiments of the present patent disclosure may be configured as an added functionality or intelligence in eNB nodes of a 5G NSA network operative to support EN-DC. In one arrangement, such added functionality may be activated after an EN-DC session has been established at an anchor eNB node and has active Protocol Data Units (PDUs) over SCG bearer. In one arrangement, responsive to a post-evaluation of potential target LTE cell(s), an embodiment of ANN process may be executed as a probabilistic model applicable on per-session basis (e.g., corresponding to each respective UE that is anchored at the serving eNB node with respect to the UE's 5G NR leg), considering not only RSRP and RSRQ of source cell but other metrics such as Channel Quality Indicator (CQI), Block Error Rate (BLER), retransmission events, UL Power Limitation, etc., along with radio link failure events, among others. A computer-implemented ML/ANN engine trained with historical and current measurements as set forth above may be configured to determine whether handover should be triggered towards a reported neighbor LTE cell or the session can be retained with the current source LTE cell with no unsatisfactory degradation in performance. As noted previously, the UE's time on NR session at the anchor/source cell can therefore be extended for a longer period due to avoidance of such handovers.

In one arrangement, an embodiment of the ML/ANN process may be based on a deep learning model that is realized using a federated architecture to train using different networks' data points from different geographical regions, wherein a suitable input feature selection process in combination with data preprocessing may be performed. For example, input measurements or a feature set applicable to known LTE standards may comprise, without limitation, several time-varying session level metrics exemplified below:

RSRP
RSRQ
AVG_CQI
PUSCH_SINR
RLC_POLL_RETX_DL
RLC_POLL_RETX_UL
HARQDLNACKRATIO
HARQFAILURERATE
RLCDLNACKRATIO
RLCULNACKRATIO
MAC_DTX_UL
MAC_DTX_DL
TBSPWRRESTRICTEDRATIO
DLPACKETLOST
ULPACKETLOST
RLF

A brief description of the foregoing metrics/measurements is set forth below in Table 1:

TABLE 1

| Measurements | Description |
| --- | --- |
| RSRP | Based on UE measurement report, indicates DL coverage |
| RSRQ | Based on UE measurement report, indicates DL quality |
| AVG_CQI | Based on CSI recorded in eNB using PM event, indicates DL quality. EVENT_PARAM_CQI_REPORTED[1,15] from Event 3075 |
| PUSCH_SINR | Recorded in eNB using PM event, indicates UL SINR on shared channel. PUSCH_SINR_BIN[0,7] from Event 3075 |
| RLC_POLL_RETX_DL | Recorded in eNB using PM event 3076. Event parameter EVENT_PARAM_PER_UE_RLC_POLL_RETX_DL. The total number of occurrences when the poll retransmit timer expiry triggers a DL AM PDU retransmission |
| RLC_POLL_RETX_UL | Recorded in eNB using PM event 3076. Event parameter EVENT_PARAM_PER_UE_RLC_POLL_RETX_UL. The total number of occurrences when an UL AM Data PDU in which Poll flag bit is set and SN is outside of receiving window is received |
| HARQDLNACKRATIO | Recorded in eNB using PM event 3076. HARQ_DL_ACK = (EVENT_PARAM_UE_HARQ_DL_ACK_QPSK + EVENT_PARAM_UE_HARQ_DL_ACK_16QAM + EVENT_PARAM_UE_HARQ_DL_ACK_64QAM), HARQ_DL_NACK = (EVENT_PARAM_UE_HARQ_DL_NACK_QPSK + EVENT_PARAM_UE_HARQ_DL_NACK_16QAM + EVENT_PARAM_UE_HARQ_DL_N ACK_64QAM). HARQDLNACKRATIO = HARQ_DL_NACK/(HARQ_DL_NACK + HARQ_DL_AC K) The total number of successful HARQ transmissions in the downlink direction using a QPSK/16QAM/64QAM modulation. Success is based on the HARQ ACK from UE. Only the Primary Component Carrier traffic contribution (aka PCell) is included. Failure is based on the HARQ NACK from UE. Only the Primary Component Carrier traffic contribution (aka PCell) is included. |
| HARQFAILURERATE | Recorded in eNB using PM event 3076. HARQ_SUCC = (EVENT_PARAM_UE_HARQ_UL_SUCC_QPSK + EVENT_PARAM_UE_HARQ_UL_SUCC_16QAM), HARQ_FAIL = (EVENT_PARAM_UE_HARQ_UL_FAIL_QPSK + EVENT_PARAM_UE_HARQ_UL_FAIL_16QAM). HARQFAILURERATE = HARQ_FAIL/(HARQ_FAIL + HARQ_SUCC) The total number of successful HARQ transmissions in the uplink direction using a QPSK/16QAM modulation. SUCC - Success is based on the CRC check, not based on if, RBS sends HARQ ACK (RBS can use the ACK even if the transport block was not successfully decoded in a way to control the HARQ) only the Primary Component Carrier traffic contribution (aka PCell) is included. FAIL - Failure is based on the CRC check (which will result in a NACK). Only the Primary Component Carrier traffic contribution (aka PCell) is included. |
| RLCDLNACKRATIO | Recorded in eNB using PM event 3076. EVENT_PARAM_PER_UE_RLC_NACK_DL/ |

TABLE 1-continued

| Measurements | Description |
|---|---|
| | (EVENT_PARAM_PER_UE_RLC_NACK_DL + EVENT_PARAM_PER_UE_RLC_ACK_DL) NACK - The total number of unsuccessful RLC PDU and RLC PDU segment transmissions (NACKs) in the downlink direction. ACK - The total number of successful RLC PDU transmissions (ACKs) in the downlink direction. |
| RLCULNACKRATIO | Recorded in eNB using PM event 3076. EVENT_PARAM_PER_UE_RLC_NACK_UL/ (EVENT_PARAM_PER_UE_RLC_NACK_UL + EVENT_PARAM_PER_UE_RLC_ACK_UL) NACK - The total number of unsuccessful RLC PDU and RLC PDU segment transmissions (NACKs) in the uplink direction. ACK - The total number of successful RLC PDU transmissions (ACKs) in the uplink direction. |
| MAC_DTX_UL | Recorded in eNB using PM event 3076. (EVENT_PARAM_PER_UE_MAC_DTX_UL_QPSK + EVENT_PARAM_PER_U E_MAC_DTX_UL_16QAM) The total number of occasions when an uplink grant was meant for HARQ transmission in the uplink direction with QPSK/16QAM, where DTX is considered the reason for no reception of HARQ in uplink in the eNB. Only the Primary Component Carrier traffic contribution (aka PCell) is included. |
| MAC_DTX_DL | Recorded in eNB using PM event 3076. (EVENT_PARAM_PER_UE_MAC_DTX_DL_QPSK + EVENT_PARAM_PER_U E_MAC_DTX_DL_16QAM) The total number of occasions when a downlink HARQ feedback was not received from a UE for a Transport Block with QPSK/16QAM and DTX is considered the reason. Only the Primary Component Carrier traffic contribution (aka PCell) is included. |
| TBSPWRRESTRICTED RATIO | Recorded in eNB using PM event 3075. EVENT_PARAM_TBSPWRRESTRICTED/ (EVENT_PARAM_TBSPWRRESTRICTED + EVENT_PARAM_TBSPWRUNRESTRICTED) The number of Transport Blocks on MAC level scheduled in uplink where the UE was power limited. The number of Transport Blocks on MAC level scheduled in uplink where the UE was NOT power limited. |
| DLPACKETLOST | Recorded in eNB using PM event 3077. Number of DL PDCP SDUs discarded/transmitted unsuccessfully |
| ULPACKETLOST | Recorded in eNB using PM event 3077. EVENT_PARAM_PER_DRB_PACKET_LOST_UL. Number of PDCP SDUs lost for a DRB, UL, based on sequence number analysis. |
| RLF | 0 to 1 based on the S1 Release Cause indicating RLF |

It should be appreciated that the foregoing list is not an exhaustive list, and depending on implementation, more or fewer features may be chosen or added in an ANN model development process for purposes of an example embodiment of the present patent disclosure. Because a selected feature set may comprise metrics having different time series data, a causality test may be used in some embodiments to forecast the occurrence of a negative event (e.g., RLF) based on one or more features. Example causality tests may include, without limitation, Granger causality tests, Chi-squared tests, etc. Based on the causality determinations, a subset of the features may be selected depending on their relevance to the negative event. The selected features may be used by a custom function to predict the probability of occurrence of the negative event (e.g., RLF) in a customizable manner specific to a particular network. Depending on the probability, a decision to execute handover from the serving anchor LTE cell to a target LTE cell may be taken. Further labeling of the probability values to determine an appropriate threshold can be done based on expert supervision in some example embodiments.

Figure 9:
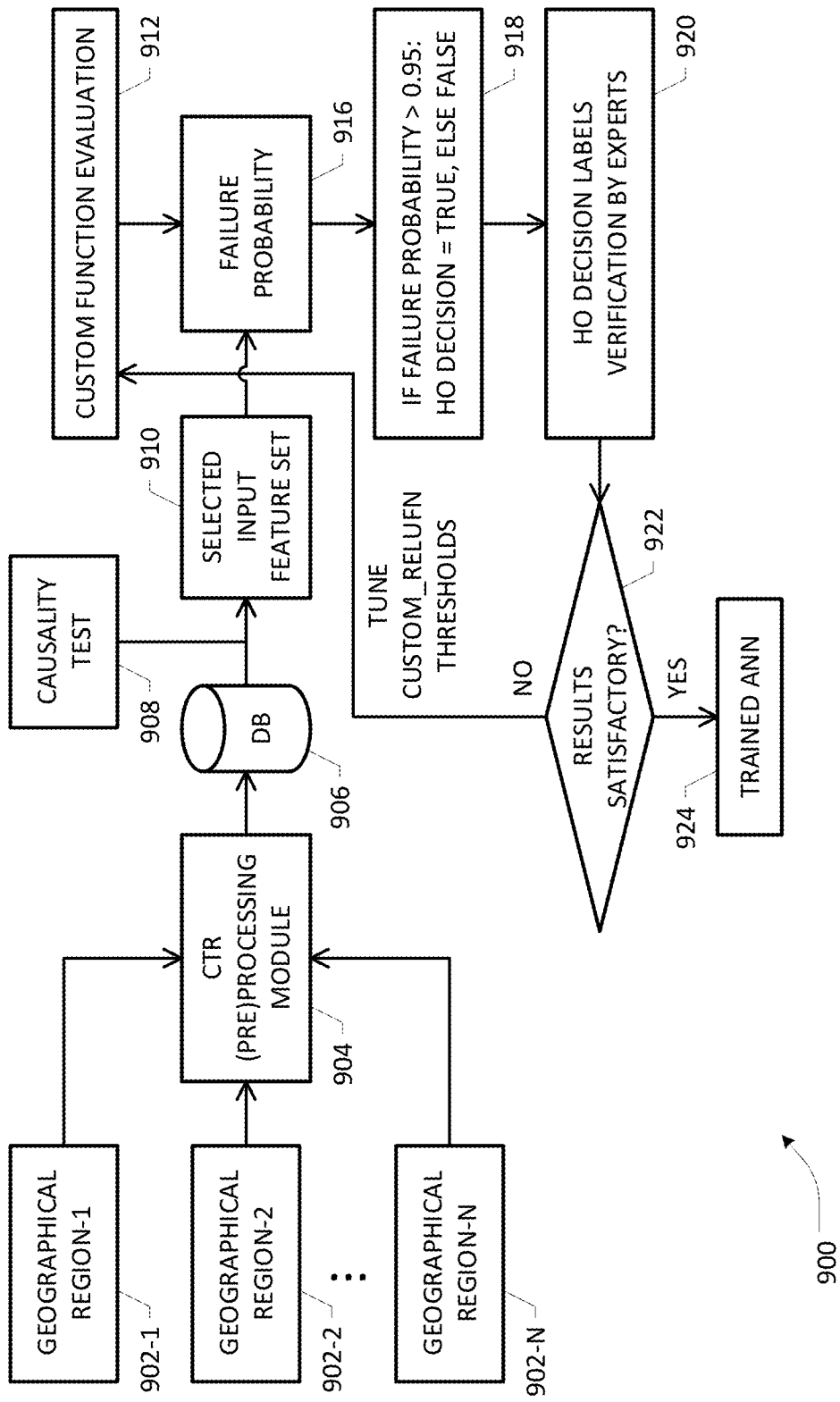
FIG. 9 depicts an example ANN generation scheme based on federated and/or supervised learning according to an example embodiment of the present patent disclosure.

FIG. 9 depicts an example ANN-based failure probability predictor generation scheme 900 involving federated and/or supervised learning according to an example embodiment of the present disclosure. A plurality of networks 902-1 to 902-N, operating in different regions and/or by different operators, may be configured to provide, generate, collect, obtain, or otherwise report various data logs, e.g., call/cell trace reports (CTRs) including applicable release codes, to a data preprocessing element 904. In one embodiment, such data collection operations may take place over a configurable period of time. Data preprocessing element 904 may be configured to execute one or more data cleaning operations as set forth above and generate session records with calculated metrics for storage in a database 906. A causality test module 908 may be applied to at least a portion of the session record data for selecting features causing or otherwise contributing to RLF, thereby generating an input feature set 910. An example custom function evaluation module 912 may be configured to provide failure probability at certain radio conditions captured in terms of the features used for training the ML model. In one arrangement, the RLF can be detected explicitly by the specific release cause indicating the event of RLF. In another arrangement, the RLF can be detected implicitly by the extremely poor values of the features representing various radio conditions (e.g., designated as unacceptable according to domain experts). In the latter case, each feature value may be normalized with respect to predefined thresholds (which may be different for each feature) using a rectified linear unit. In one arrangement, the maximum of these values may be considered to drive the failure probability. Set forth below are example code portions associated with custom function evaluation block 912:

```
Custom_ReluFn
#type_: 'Lowisbad', 'Lowisgood'
def getImpact(val_, thresh_a, thresh_b, type_):
    if(type_ = = 'lowisbad'):
        # thresh_b : min(series)
        if(val_ < thresh_a) :
            return (thresh_a - val_) / (thresh_a - thresh_b)
        else:
            return 0
    elif (type_ = = 'lowisgood'):
        # thresh_b : max(series)
        if(val_ > thresh_a) :
            return (val_ - thresh_a ) / (thresh_b - thresh_a)
        else:
            return 0
Failure Probability [0,1]:
If RLF = = True:
    return 1 (Explicit identification)
else:
    return Max [Custom_ReluFn(feat1), . . . , Custom_ReluFn(featn)]
        (Implicit identification)
```

An ANN/ML based failure probability predictor 916 is operative responsive to the selected input feature set 910 and custom function evaluation 912. An iterative process block may be executed as part of supervised training to generate a trained ANN model or engine 924. As illustrated, if the predicted failure probability is greater than a threshold value (e.g., >0.95), an HO decision is returned as True, otherwise an HO decision of False is returned, as set forth at decision module 918. A labeling/verification module 920 may be operative in conjunction with input from domain experts, e.g., network engineers, autonomous entities, to determine if the predicted results are acceptable (e.g., within certain thresholds), as set forth at block 922. In one arrangement, appropriate feedback control may be provided to tune the threshold values used in the custom function evaluation 912 for training the ML process in response to determining that the predicted results are not satisfactory. Upon achieving successful predictive capability, trained ANN module 924 may be obtained for deployment as an added intelligence operative in conjunction with an anchor node for modulating HO decision behavior according to the embodiments set forth in detail hereinabove.

Figure 10:
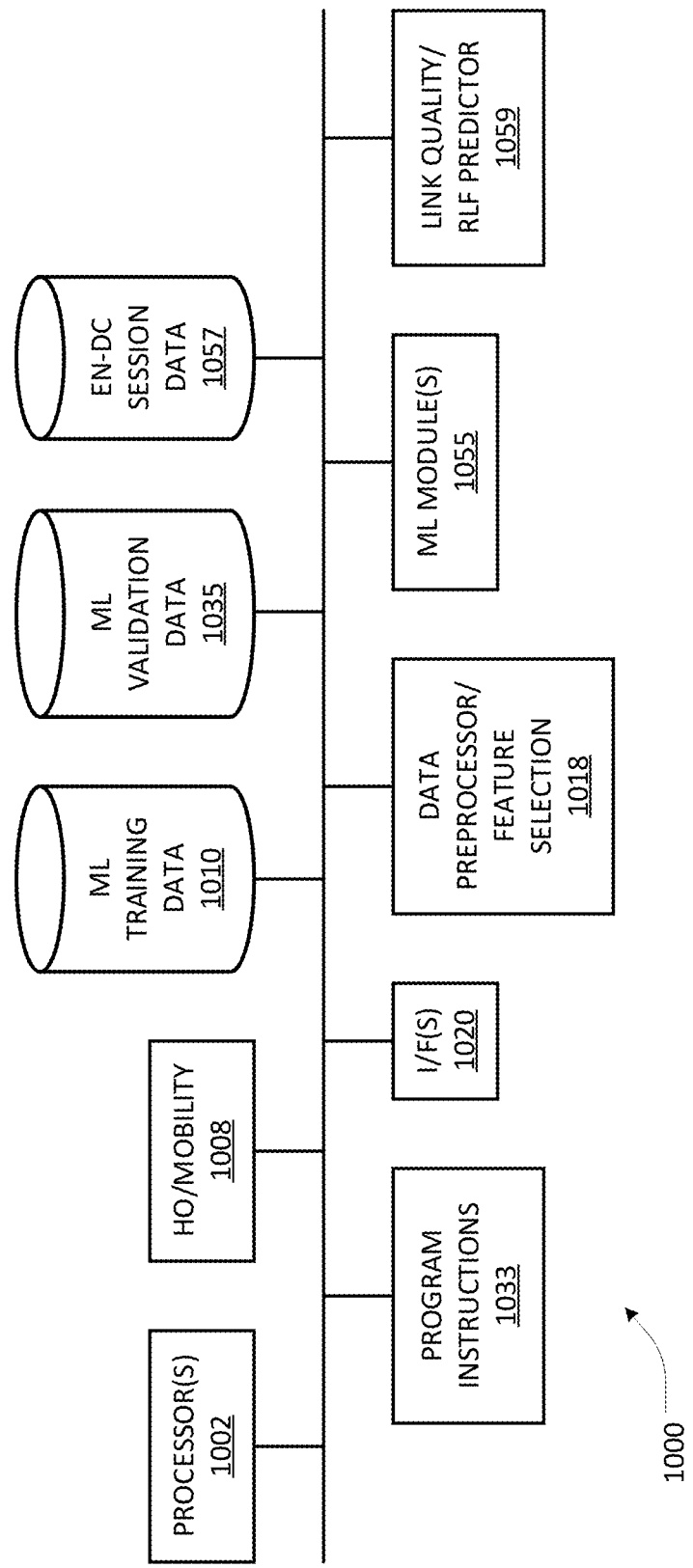
FIG. 10 depicts a block diagram of a system involving a plurality of modules that may be configured as an integrated or distributed platform for effectuating UE handover/mobility in an MR-DC network according to an example embodiment of the present patent disclosure.

Turning to FIG. 10, a block diagram of a computer-implemented apparatus 1000 is illustrated therein, which may be (re)configured and/or (re)arranged as a platform, (sub)system, server, node or element operative in association with an anchor layer node of a multi-RAT DC-capable network architecture to effectuate HO decision modulation according to an embodiment of the present disclosure. It should be appreciated that apparatus 1000 may be implemented as part of an integrated network node or platform, including a management node in some embodiments, or as a standalone node depending on implementation. One or more processors 1002 may be operatively coupled to various modules that may be implemented in persistent memory for executing suitable program instructions or code portions (e.g., code portion 1033) with respect to effectuating any of the processes, methods and/or flowcharts set forth hereinabove in association with one or more modules, e.g., HO/mobility module 1008, ML/ANN module(s) 1055 (where ML-based quality degradation or link failure prediction is implemented), other quality degradation predictor modules 1059 (where non-ML statistical or mathematical techniques are implemented for failure prediction), etc. One or more databases may be provided as part of or in association with apparatus 1000 for storing various types of data, e.g., ML training data 1010, ML validation data 1035, session data including CTR data and measurement report data 1057, etc., wherein some of the training/validation data may be obtained pursuant to federated learning. A data preprocessor and feature selection module 1018 may also be provided in some implementations of apparatus 1000.

Although not specifically shown herein, one or more Big Data analytics modules may also be interfaced with apparatus 1000 for providing predictive analytics with respect to HO/mobility behavior of respective UEs and corresponding sessions managed by appropriate anchor layer elements. Depending on the implementation, one or more "upstream" interfaces (I/F) and and/or "downstream" I/Fs, collectively I/F(s) 1020, may be provided for interfacing with various network elements (e.g., other eNBs, gNBs, EPC/5GC elements, data center nodes, management nodes (e.g., business support system (BSS) nodes and/or other operations support system (OSS) components, etc.), wherein such interfaces may be referred to as a first interface, a second interface, and so on, depending on configuration, implementation and/or architectural design. Furthermore, in some arrangements of the computer-implemented apparatus 1000, various physical resources and services executing thereon may be provided as virtual appliances wherein the resources and service functions are virtualized into suitable virtual network functions (VNFs) via a virtualization layer. Example resources may comprise compute resources, memory resources, and network interface resources, which may be virtualized into corresponding virtual resources, respectively, that may be managed by respective element management systems (EMS) via a virtualization layer (also sometimes referred to as virtual machine monitor (VMM) or "hypervisor").

At least a portion of an example network architecture and associated HO/mobility modulation functionality disclosed herein may also be virtualized as set forth above and architected in a cloud-computing environment comprising a shared pool of configurable virtual resources. Various pieces of hardware/software associated with eNB/gNB nodes, management nodes, etc., may therefore be implemented in a service-oriented architecture, e.g., Software as a Service (Saas), Platform as a Service (PaaS), Infrastructure as a Service (IaaS), etc., with multiple entities providing different features of an example embodiment of the present patent disclosure, wherein one or more layers of virtualized environments may be instantiated on commercial off-the-shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Based on the foregoing, skilled artisans will appreciate that at least some example embodiments herein advantageously maximize NR session time on 5G in an NR NSA deployment by optimizing the anchor LTE layer handover behavior wherein LTE anchor mobility may be minimized without sacrificing quality. Some example embodiments may be advantageously configured with flexibility to determine mobility thresholds for each EN-DC session (e.g., per session and/or per UE in some arrangements, thereby allowing finer granularity in handover decision management) instead of using current static triggering criteria, which are tunable at cell and QCI level only. Because handover triggering points may be determined per session and optimized based on the operating condition of a given session, better end user experience and improved session integrity may be achieved in an example 5G NSA implementation. In some embodiments, the LTE handover threshold may be determined using a federated learning model, which allows a network operator to determine more accurate handover triggering points in a customizable manner for respective regions and/or network portions. As such, example embodiments involving ML/ANN with a learning process may encompass several features (or, metrics) to determine a satisfactory operating point/range for the anchor LTE layer over a broader parametric space. It should be appreciated that such broader range of feature parametric sets provide for handover criteria that are over and above the current handover determination criteria, which may help facilitate a more informed decision-making process regarding handover.

Although example embodiments and their advantages and benefits have been particularly set forth in reference to a 5G NSA network architecture involving 4G/5G interworking, skilled artisans will recognize that the teachings of the present disclosure are not necessarily limited thereto. Embodiments herein can therefore also be practiced in other network architectures having multi-RAT interworking (e.g., 4.5G networks, 6G networks, 7G networks, Next Generation Networks, etc.), including mobility anchor layers in either macrocell and/or small cell architectures in a heterogeneous cell densification environment, for supporting MR-DC based mobility/HO management.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices), computer programs comprising the instructions and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a RAM circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present patent disclosure may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Also, some blocks in the flowchart(s) can be optionally omitted. Furthermore, although some of the diagrams include arrows on communication paths to show a direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Where the phrases such as "at least one of A and B" or phrases of similar import are recited or described, such a phrase should be understood to mean "only A, only B, or both A and B." Reference to an element in the singular is not intended to mean "one and only one" unless explicitly so stated, but rather "one or more." Moreover, the terms "first," "second," and "third," etc. when employed in reference to elements or features are used merely as labels, and are not intended to impose numerical requirements, sequential ordering or relative degree of significance or importance on their objects. Reference to terms including one or more connecting underscores, dashes, or hyphens, etc. between constituent parts includes reference to equivalent terms without the underscore(s), dash(es) or hyphen(s). All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the claims appended below.

The invention claimed is:

1. A handover (HO) management method performed by an anchor node serving a dual connectivity (DC) user equipment (UE), the anchor node configured as a master node of a source cell operating in a first radio access technology (RAT) with respect to a secondary node operating in a second RAT, the master node and the secondary node connected via an inter-nodal interface, the method comprising:
   receiving a measurement report from the UE, the measurement report containing information relating to one or more neighbor cells operating in the first RAT;
   responsive to the measurement report, selecting a particular neighbor cell as a target cell for handing over the UE;
   determining that there is traffic with the secondary node over the inter-nodal interface;
   responsive to determining that a parametric difference between the source cell and the target cell exceeds a threshold value, performing a handover of the UE to the target cell;
   responsive to determining that the parametric difference is less than or equal to the threshold value, performing a quality degradation prediction with respect to the UE to estimate a likelihood of service failure for the UE; and
   responsive to determining that the likelihood of service failure does not exceed a probability threshold, suppressing handover of the UE to the target cell.

2. The method as recited in claim 1, further comprising handing over the UE to the target cell in response to determining that the likelihood of service failure exceeds the probability threshold.

3. The method as recited in claim 1, wherein the quality degradation prediction is performed by a machine learning (ML) process comprising a trained artificial neural network (ANN), and wherein the trained ANN is trained based on a set of features pertaining to the first RAT in association with at least one of (i) supervised learning, (ii) semi-supervised learning, and/or (iii) reinforcement learning.

4. The method as recited in claim 1, wherein the likelihood of service failure is determined as a probability of radio link failure (RLF) associated with the UE, and further wherein the anchor node comprises an eNB node of 4G Long Term Evolution (LTE) cellular technology and the secondary node comprises a gNB node of 5G New Radio (NR) cellular technology, the UE operative with at least one of (i) master cell group (MCG) radio bearers served by the eNB node, (ii) secondary cell group (SCG) radio bearers served by the gNB node, and (iii) Split radio bearers served by both the eNB and gNB nodes.

5. The method as recited in claim 1, wherein the measurement report comprises at least one of following LTE measurement reports: A1 reports, A2 reports, A3 reports, A4 reports, A5 reports, A6 reports, B1 reports, B1-NR reports, B2 reports, B2-NR reports, C1 reports, and C2 reports.

6. The method as recited in claim 1, wherein the traffic on the inter-nodal interface comprises at least one of (i) control plane traffic including signaling messages, (ii) user plane traffic including data, or both.

7. The method as recited in claim 1, wherein the parametric difference comprises a difference between the source cell's Reference Signal Received Power (RSRP) and the target cell's RSRP, and the threshold value comprises a neighbor cell interference parameter.

8. The method as recited in claim 1, wherein the parametric difference comprises a difference between the source cell's Reference Signal Received Quality (RSRQ) and the target cell's RSRQ, and the threshold value comprises a neighbor cell quality threshold.

9. The method as recited in claim 1, wherein the handover is an intra-frequency handover or an inter-frequency handover.

10. The method as recited in claim 1, further comprising:
   prior to determining that there is traffic over the inter-nodal interface, determining if there exists a radio bearer of a real time service via the master node when the measurement report is received; and
   if there exists a radio bearer of a real time service, performing an LTE mobility procedure in response to the measurement report.

11. A non-transitory computer readable medium of an anchor node serving a dual connectivity (DC) user equipment (UE), the anchor node configured as a master node of a source cell operating in a first radio access technology (RAT) with respect to a secondary node operating in a second RAT, the master node and the secondary node connected via an inter-nodal interface, the non-transitory computer readable medium having program instructions stored thereon, the program instructions executable by one or more processors for performing a method comprising:
   receiving a measurement report from the UE, the measurement report containing information relating to one or more neighbor cells operating in the first RAT;
   responsive to the measurement report, selecting a particular neighbor cell as a target cell for handing over the UE;
   determining that there is traffic with the secondary node over the inter-nodal interface;
   responsive to determining that a parametric difference between the source cell and the target cell exceeds a threshold value, performing a handover of the UE to the target cell;
   responsive to determining that the parametric difference is less than or equal to the threshold value, performing a quality degradation prediction with respect to the UE to estimate a likelihood of service failure for the UE; and responsive to determining that the likelihood of service failure does not exceed a probability threshold, suppressing handover of the UE to the target cell.

12. A system for effectuating handover (HO) management at an anchor node serving a dual connectivity (DC) user equipment (UE), the anchor node configured as a master node of a source cell operating in a first radio access technology (RAT) with respect to a secondary node operating in a second RAT, the master node and the secondary node connected via an inter-nodal interface, the system comprising:
one or more processors; and
a persistent memory having program instructions stored thereon, the program instructions, when executed by the one or more processors, configured to perform:
receiving a measurement report from the UE, the measurement report containing information relating to one or more neighbor cells operating in the first RAT;
responsive to the measurement report, selecting a particular neighbor cell as a target cell for handing over the UE;
determining that there is traffic with the secondary node over the inter-nodal interface;
responsive to determining that a parametric difference between the source cell and the target cell exceeds a threshold value, causing a handover of the UE to the target cell;
responsive to determining that the parametric difference is less than or equal to the threshold value, performing a quality degradation prediction with respect to the UE to estimate a likelihood of service failure for the UE; and
responsive to determining that the likelihood of service failure does not exceed a probability threshold, suppressing handover of the UE to the target cell.

13. The system as recited in claim 12, wherein the program instructions further comprise instructions for handing over the UE to the target cell in response to determining that the likelihood of service failure exceeds the probability threshold.

14. The system as recited in claim 12, further comprising a trained artificial neural network (ANN) operative as a predictor engine for generating the quality degradation prediction, wherein the trained ANN is trained based on a set of features pertaining to the first RAT in association with at least one of (i) supervised learning, (ii) semi-supervised learning, and/or (iii) reinforcement learning.

15. The system as recited in claim 12, wherein the likelihood of service failure is determined as a probability of radio link failure (RLF) associated with the UE, and further wherein the anchor node comprises an eNB node of 4G Long Term Evolution (LTE) cellular technology and the secondary node comprises a gNB node of 5G New Radio (NR) cellular technology, the UE operative with at least one of (i) master cell group (MCG) radio bearers served by the eNB node, (ii) secondary cell group (SCG) radio bearers served by the gNB node, and (iii) Split radio bearers served by both the eNB and gNB nodes.

16. The system as recited in claim 12, wherein the measurement report comprises at least one of following LTE measurement reports: A1 reports, A2 reports, A3 reports, A4 reports, A5 reports, A6 reports, B1 reports, B1-NR reports, B2 reports, B2-NR reports, C1 reports, and C2 reports.

17. The system as recited in claim 12, wherein the traffic on the inter-nodal interface comprises at least one of (i) control plane traffic including signaling messages, (ii) user plane traffic including data, or both.

18. The system as recited in claim 12, wherein the parametric difference comprises a difference between the source cell's Reference Signal Received Power (RSRP) and the target cell's RSRP, and the threshold value comprises a neighbor cell interference parameter.

19. The system as recited in claim 12, wherein the parametric difference comprises a difference between the source cell's Reference Signal Received Quality (RSRQ) and the target cell's RSRQ, and the threshold value comprises a neighbor cell quality threshold.

20. The system as recited in claim 12, wherein the handover is an intra-frequency handover or an inter-frequency handover.

21. The system as recited in claim 12, wherein the program instructions further comprise instructions configured to perform:
prior to determining that there is traffic over the inter-nodal interface, determining if there exists a radio bearer of a real time service via the master node when the measurement report is received; and
if there exists a radio bearer of a real time service, performing an LTE mobility procedure in response to the measurement report.

\* \* \* \* \*